US012601691B2

(12) United States Patent
Takamori et al.

(10) Patent No.: US 12,601,691 B2
(45) Date of Patent: Apr. 14, 2026

(54) METHOD FOR MANUFACTURING SEPARATOR FOR ELECTRICAL STORAGE DEVICE

(71) Applicant: Asahi Kasei Battery Separator Corporation, Tokyo (JP)

(72) Inventors: Hitoshi Takamori, Tokyo (JP); Takeshi Suzuki, Tokyo (JP)

(73) Assignee: Asahi Kasei Battery Separator Corporation, Tokyo (JP)

( * ) Notice: Subject to any disclaimer, the term of this patent is extended or adjusted under 35 U.S.C. 154(b) by 282 days.

(21) Appl. No.: 17/924,191

(22) PCT Filed: May 11, 2021

(86) PCT No.: PCT/JP2021/017923
§ 371 (c)(1),
(2) Date: Nov. 9, 2022

(87) PCT Pub. No.: WO2021/230245
PCT Pub. Date: Nov. 18, 2021

(65) Prior Publication Data
US 2023/0275319 A1      Aug. 31, 2023

(30) Foreign Application Priority Data

May 11, 2020    (JP) ................................. 2020-083303

(51) Int. Cl.
*G01N 21/89*          (2006.01)
*G01N 21/84*          (2006.01)
(Continued)

(52) U.S. Cl.
CPC ....... *G01N 21/8901* (2013.01); *G01N 21/892* (2013.01); *H01M 50/443* (2021.01); *G01N 2021/8427* (2013.01)

(58) Field of Classification Search
CPC ............. H01M 50/414; H01M 50/443; H01M 50/403; H01M 50/406; H01M 50/409;
(Continued)

(56) References Cited

U.S. PATENT DOCUMENTS

| | | | |
|---|---|---|---|
| 6,191,850 B1* | 2/2001 | Chiang .............. | G01N 21/8806 356/237.4 |
| 2006/0035548 A1* | 2/2006 | Goto ...................... | B29C 70/22 156/60 |

(Continued)

FOREIGN PATENT DOCUMENTS

| | | |
|---|---|---|
| EP | 3379602 A1 | 9/2018 |
| EP | 3627143 A1 | 3/2020 |

(Continued)

OTHER PUBLICATIONS

English translation of JP-2004245829-A, published Sep. 2, 2004. (Year: 2004).*

(Continued)

*Primary Examiner* — Christina A Riddle

(74) *Attorney, Agent, or Firm* — Morgan, Lewis & Bockius LLP

(57) ABSTRACT

Provided is an inspection device or a manufacturing method for a separator having a thermoplastic polymer layer. A separator S includes a substrate, and a thermoplastic polymer layer disposed on a portion of one side or both sides of the substrate. The present invention is characterized by including a step for inspecting the surface of the separator S, (Continued)

wherein the separator is inspected by using an inspection device having a camera 2 and a light source 1 that irradiates an inspection portion of the separator with light at an incident angle of 60° to 90°.

18 Claims, 3 Drawing Sheets

(51) Int. Cl.
*G01N 21/892* (2006.01)
*H01M 50/443* (2021.01)

(58) Field of Classification Search
CPC ............ H01M 50/417; H01M 50/431; H01M 50/446; H01M 50/449; H01M 50/451; H01M 50/457; H01M 50/489; H01M 10/0525; H01M 50/461; H01M 50/491; H01M 10/0565; H01M 10/02; H01M 10/04; H01M 10/0404; H01M 10/0413; H01M 10/0436; H01M 10/05; H01M 10/058; H01M 10/0585; H01M 10/4235; H01M 2004/021; H01M 2004/027; H01M 2004/028; H01M 2220/30; H01M 2300/0082; H01M 4/04; H01M 4/0402; H01M 4/133; H01M 4/1393; H01M 4/621; H01M 4/622; H01M 4/661; H01M 4/8828; H01M 50/42; H01M 50/423; H01M 50/426; H01M 50/429; H01M 50/434; H01M 50/44; H01M 50/46; H01M 50/437; H01M 50/463; H01M 10/052; H01M 50/411; H01M 10/4285; G01N 21/892; G01N 2021/8427; G01N 2021/8822; G01N 21/8422; G01N 21/95; G01N 21/8901; G01N 21/33; G01N 21/894; Y02E 60/10; Y02E 60/13; Y02E 60/50; Y02P 70/50; B01D 71/261; B01D 2325/0281; B01D 2325/04; B01D 2325/24; B01D 2325/44; B01D 67/0088; B01D 69/02; B01D 69/1213; B01D 71/262; B32B 2457/10; B32B 27/32; B32B 15/082; B32B 15/085; B32B 15/18; B32B 15/20; B32B 2250/03; B32B 2250/04; B32B 2255/10; B32B 2255/26; B32B 2264/0214; B32B 2264/0235; B32B 2264/025; B32B 2264/0271; B32B 2264/0278; B32B 2264/102; B32B 2264/104; B32B 2264/12; B32B 2307/306; B32B 2307/3065; B32B 2307/406; B32B 2307/416; B32B 2307/50; B32B 2307/718; B32B 2307/72; B32B 2307/724; B32B 2307/726; B32B 2307/732; B32B 27/08; B32B 27/20; B32B 27/285; B32B 27/302; B32B 27/304; B32B 27/308; B32B 3/266; B32B 37/182; B32B 5/18; B32B 7/12; H01G 11/52; B29C 48/08; B29C 48/914; B29C 48/919; Y02T 10/70; Y10T 156/10; Y10T 29/49108

USPC ............................................ 356/237.1–237.6
See application file for complete search history.

(56) References Cited

U.S. PATENT DOCUMENTS

| | | | |
|---|---|---|---|
| 2010/0091302 A1* | 4/2010 | Kim ...................... | G01B 11/24 |
| | | | 356/603 |
| 2010/0259748 A1 | 10/2010 | Suzuki et al. | |
| 2010/0283943 A1* | 11/2010 | Kimura ............. | G02F 1/133528 |
| | | | 156/64 |
| 2011/0311855 A1 | 12/2011 | Peng et al. | |
| 2012/0282514 A1 | 11/2012 | Yamada | |
| 2012/0311852 A1 | 12/2012 | Onoda et al. | |
| 2014/0028833 A1* | 1/2014 | Craveiro ............... | G01N 21/95 |
| | | | 348/131 |
| 2014/0227603 A1 | 8/2014 | Ogata | |
| 2015/0188108 A1 | 7/2015 | Miyazawa et al. | |
| 2015/0346109 A1* | 12/2015 | Fontaine ............... | G01N 21/94 |
| | | | 356/239.8 |
| 2017/0125767 A1 | 5/2017 | Ogata et al. | |
| 2017/0263907 A1* | 9/2017 | Ameyama ............. | C08F 220/14 |
| 2018/0261815 A1 | 9/2018 | Ikemi et al. | |
| 2020/0030754 A1 | 1/2020 | Kubota et al. | |
| 2020/0259148 A1 | 8/2020 | Miyazawa et al. | |
| 2021/0265673 A1* | 8/2021 | Jordan ............... | H01M 50/105 |
| 2023/0126524 A1 | 4/2023 | Jung et al. | |

FOREIGN PATENT DOCUMENTS

| | | | |
|---|---|---|---|
| JP | H09-136323 A | | 5/1997 |
| JP | 2004245829 A | * | 9/2004 |
| JP | 2009-133725 A | | 6/2009 |
| JP | 2010-008266 A | | 1/2010 |
| JP | 2011-171290 A | | 9/2011 |
| JP | 2012-181176 A | | 9/2012 |
| JP | 2013-514389 A | | 4/2013 |
| JP | 2015103482 A | * | 6/2015 |
| JP | 2017-084671 A | | 5/2017 |
| JP | 2018-036161 A | | 3/2018 |
| JP | 2018-105706 A | | 7/2018 |
| JP | 2018-170281 A | | 11/2018 |
| JP | 2019-008884 A | | 1/2019 |
| JP | 2023-517563 A | | 4/2023 |
| KR | 10-2018-0037260 A | | 4/2018 |
| WO | 86/05588 A1 | | 9/1986 |
| WO | 2009/069813 A1 | | 6/2009 |
| WO | 2011/104843 A1 | | 9/2011 |
| WO | 2013/047853 A1 | | 4/2013 |
| WO | 2014/017651 A1 | | 1/2014 |
| WO | 2017/086466 A1 | | 5/2017 |

OTHER PUBLICATIONS

English translation of JP-2015103482-A, published Jun. 4, 2015. (Year: 2015).*

International Preliminary Report on Patentability and Written Opinion issued in corresponding International Patent Application No. PCT/JP2021/017923 dated Aug. 3, 2021.

Supplementary European Search Report issued in European Patent Application No. 21803019.5 dated Sep. 29, 2023.

International Search Report issued in corresponding International Patent Application No. PCT/JP2021/017923 dated Aug. 3, 2021.

Written Opinion issued in corresponding International Patent Application No. PCT/JP2021/017923 dated Aug. 3, 2021.

* cited by examiner (A)

(B)

(A)          (B)

(C)          (D)          (E)

METHOD FOR MANUFACTURING SEPARATOR FOR ELECTRICAL STORAGE DEVICE

FIELD

The present invention relates to a method for manufacturing a separator for an electrical storage device.

BACKGROUND

Electrical storage devices such as lithium ion secondary batteries have been actively developed in the prior art. An electrical storage device is usually designed with a microporous membrane (separator) between a positive electrode and a negative electrode. The separator has the function of preventing direct contact between the positive electrode and negative electrode, while also allowing ions to pass through the electrolyte solution that is held in the micropores.

A separator must exhibit safety features including rapid termination of the battery reaction upon abnormal heating (fuse characteristic), and shape maintenance even at high temperatures to prevent the danger of direct reaction between the positive electrode and negative electrode (short-circuit resistance characteristic). Techniques in which a laminated stack comprising electrodes and a separator is wound and the wound body is hot pressed in order to reduce the volume of the wound body, have been implemented with the purpose of achieving higher capacity electrical storage devices. One technique that is employed to anchor the electrodes and separator after pressing to maintain the pressed volume, is to dispose on the separator a thermoplastic polymer-containing layer that exhibits an adhesive function under prescribed conditions, in order to increase adhesion of the separator for the electrodes.

For example, PTL 1 discloses a separator designed to have excellent adhesion for electrodes and also excellent handleability. The separator comprises a thermoplastic polymer-containing layer with a thermoplastic polymer-containing portion and a thermoplastic polymer-free portion, on a polyolefin microporous membrane as the substrate. The thermoplastic polymer has at least two glass transition temperatures, at least one glass transition temperature being in the range of lower than 20° C. and at least one glass transition temperature being in the range of 20° C. or higher.

Also disclosed is a method for examining a metal sheet having on the surface multiple raised sections on the micron order formed at micron-order spacings, though not intended for use as a separator, wherein light having width in the direction perpendicular to the optical axis is irradiated onto the metal sheet by coaxial epi-illumination or oblique illumination, and the dropout sections where raised sections are not formed are detected (PTL 2).

CITATION LIST

Patent Literature

[PTL 1] WO2014/017651
[PTL 2] Japanese Unexamined Patent Publication No. 2010-008266

SUMMARY

Technical Problem

With increasing environmental awareness in recent years leading to more interest in electrical storage devices in motor vehicles (EV), it is becoming common for separators exhibiting adhesion with electrodes to be used in lithium ion secondary batteries that are mounted in such electrical storage devices, in order to increase productivity during the step of stacking the electrodes and separators.

An adhesive separator that has adhesion for electrodes has an adhesive layer on the separator surface, often with a fixed ratio of area coverage on the adhesive layer. If the area coverage on the adhesive layer is less than a predetermined ratio it is not possible to obtain adequate adhesive force with the electrode, while if the area coverage on the adhesive layer is greater than the predetermined ratio the battery resistance increases, which is disadvantageous in terms of battery output or battery life.

It is therefore desirable to use an inspection device to measure the area coverage on the adhesive layer in order to ensure that the area coverage on the adhesive layer over the surface of the adhesive separator is at the predetermined ratio. However, techniques for precisely measuring the area coverage on the adhesive layers of separators have not been attempted with existing inspection devices. Adhesive layers are usually made of organic components, and it has been difficult to discern the borders between organic component substrate surfaces and adhesive layers. In addition, the thicknesses of adhesive layers on separators are between 0.1 μm and several μm and the relative lack of height difference makes it extremely difficult to detect the adhesive layer portion alone. Therefore, control of the area requires extraction for each sample and evaluation using a scanning electron microscope, which has been problematic due to the large number of steps and long time required.

The present invention has been devised in light of the circumstances of the prior art, and its object is to provide a separator inspection device and production method that allow precise and efficient measurement of the area coverage of the thermoplastic polymer layer on a separator surface having a thermoplastic polymer layer as the adhesive layer.

Solution to Problem

The present inventors have studied solutions for the problem described above and have completed this invention upon finding that the problem can be solved by using an inspection device for an adhesive separator having the following construction. Specifically, the present invention provides the following.

[1] An inspection device for a separator having a thermoplastic polymer layer, wherein:

the separator comprises a substrate and a thermoplastic polymer layer disposed on a part of one or both sides of the substrate, and the inspection device has a light source that irradiates light onto an inspection portion of the separator at an incident angle θ of 60° to 90°, and a camera.

[2] The inspection device for a separator according to [1] above, wherein the distance from the surface of the separator to the camera is 10 mm to 1000 mm.

[3] The inspection device for a separator according to [1] or [2] above, wherein the camera is positioned at an angle in the range of −5° to +5° with respect to an angle of reflection of incident light from the light source.

[4] The inspection device for a separator according to any one of [1] to [3] above, which has a mount that anchors the camera, the mount having a stage allowing the camera to be moved in any one or two or more directions from among forward-backward, right-left and up-down.

[5] The inspection device for a separator according to any one of [1] to [4] above, wherein the size of the light source is 1 mm to 3000 mm.

[6] The inspection device for a separator according to any one of [1] to [5] above, wherein light is irradiated onto the inspection portion of the separator using two or more light sources.

[7] The inspection device for a separator according to [6] above, wherein the two or more light sources are disposed at equal spacings around the inspection portion of the separator.

[8] A method for producing a separator having a thermoplastic polymer layer, wherein:

the separator comprises a substrate and a thermoplastic polymer layer disposed on a part of one or both sides of the substrate, and the method comprises a step of inspecting a surface of the separator, the separator being inspected using an inspection device having a light source that irradiates light onto an inspection portion of the separator at an incident angle θ of 60° to 90°, and a camera.

[9] The method for producing a separator according to [8] above, wherein the thermoplastic polymer layer includes a particulate polymer compound.

[10] The method for producing a separator according to [9] above, wherein a mean particle size of the particulate polymer is 50 nm to 10,000 nm.

[11] The method for producing a separator according to any one of [8] to [10] above, wherein the form of the thermoplastic polymer has a unit pattern which is periodic.

[12] The method for producing a separator according to any one of [8] to [11] above, wherein an inorganic filler layer is present on one or both sides of the substrate, and the thermoplastic polymer layer is present on at least a portion of the inorganic filler layer.

[13] The method for producing a separator according to [12] above, wherein a volume-average particle size of the inorganic filler in the inorganic filler layer is 50 nm to 2,000 nm.

[14] The method for producing a separator according to [12] or [13] above, wherein the volume-average particle size D1 of the thermoplastic polymer and the volume-average particle size D2 of the inorganic filler satisfy the following formula:

$$D1/D2 \leq 0.8 \text{ or } D1/D2 \geq 1.2.$$

[15] A method for producing a separator having a thermoplastic polymer layer, wherein:

the separator comprises a substrate and a thermoplastic polymer layer disposed on a part of one or both sides of the substrate, the method comprises an inspection step in which a surface of the separator is inspected using an inspection device having a light source that irradiates light onto the surface of the separator at an incident angle θ of 60° to 90°, and a camera, and the inspection step comprises a detection step in which a form and/or coverage ratio of the thermoplastic polymer layer is detected from an image photographed by the camera.

[16] The method for producing a separator according to [15] above, wherein in the inspection step the quality of the separator is further assessed based on the form and/or coverage ratio obtained in the detection step.

The following are also preferred aspects of the invention.

[17] The inspection device for a separator according to any one of [1] to [7] above, wherein the incident angle θ is 75° or greater and less than 90°.

[18] The method for producing a separator according to [11] above, wherein a size of the unit pattern is 10 μm×10 μm to 10 mm×10 mm.

[19] The method for producing a separator according to any one of [12] to [14] above, wherein an amount of a binder in the inorganic filler layer is 0.5 parts by weight to 20 parts by weight with respect to 100 parts by weight of the inorganic filler.

The conditions specified in any one of [9] to [14], [18] and [19] above may be considered to be the description of the separator according to the invention for an inspection device, and the conditions according to any one of [2] to [7] and [17] above may be considered to be the description of the inspection device according to the invention of the method for producing a separator.

Advantageous Effects of Invention

According to the invention it is possible to precisely and efficiently measure the area coverage of a thermoplastic polymer layer on a separator surface which has a thermoplastic polymer layer. Since an image of the coating film surface of the thermoplastic polymer layer is evaluated after drying of the thermoplastic polymer layer, the method for evaluating the area coverage of the thermoplastic polymer layer is convenient, while also allowing evaluation without destruction of the separator and thus contributing to more manageable development and production steps for excellent separators.

DESCRIPTION OF EMBODIMENTS

Figure 1:
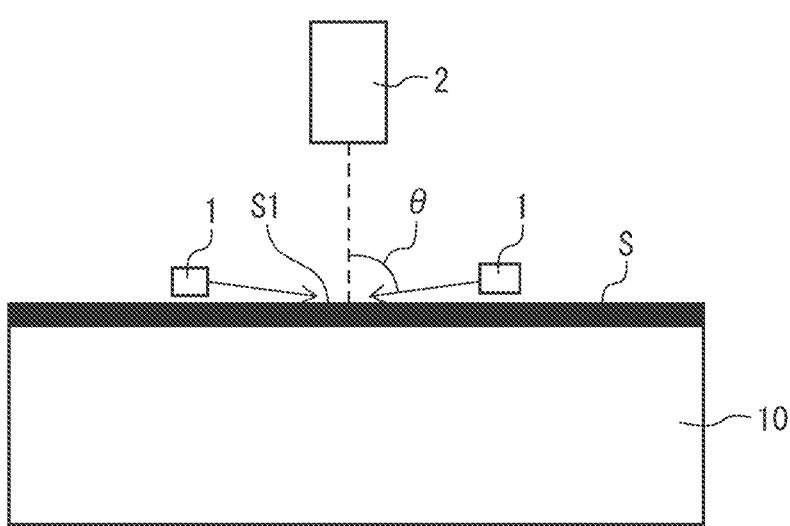
FIG. 1 is a side view of an example of an inspection device.

Embodiments for carrying out the invention (hereunder referred to simply as "embodiments") will now be described in detail with reference to the accompanying drawings as necessary, with the understanding that the invention is not limited to the embodiments. The invention may incorporate various modifications without falling outside of the scope of its gist.

The terms "formed on the surface", "upper", and "above" as used herein do not mean that the positional relationship of the respective members is "directly above". For example, the expressions "thermoplastic polymer-containing layer containing a thermoplastic polymer formed on at least part of at least one side of the substrate", "thermoplastic polymer-containing layer formed on the substrate" and "thermoplastic polymer-containing layer formed on the surface of the substrate" do not exclude cases where an optional layer (a layer with a heat-resistant function such as an inorganic filler porous layer) is included between the substrate and the thermoplastic polymer-containing layer.

The term "adhesion" as used herein is adhesion during high temperature pressing (assumed to be adhesion with the electrodes), and the term "blocking" is adhesion between the separator when the separator is wound at ordinary temperature (synonymous with "attachment" or "stickiness" between the separators or between parts of the separator). The term "bonding" means the adhesive force of a binder with a substrate.

As used herein, the term "(meth)acryl" means "acryl" and its corresponding "methacryl", the term "(meth)acrylate" means "acrylate" and its corresponding "methacrylate", and the term "(meth)acryloyl" means "acryloyl" and its corresponding "methacryloyl".

The term "MD direction" means the "machine direction" when the polyolefin microporous membrane is being continuously cast, and the term "TD direction" means the direction crossing the MD direction at an angle of 90°.

Where value ranges are separated by the preposition "to" herein, unless otherwise specified, it means that the ranges include the two numerical values given as the upper and lower bounds.

<Method for Producing Separator>

One aspect of the invention provides a method for producing a separator.

The method for producing a separator according to the first embodiment is a method for producing a separator having a thermoplastic polymer layer (thermoplastic polymer-containing layer), wherein the separator comprises a substrate and the thermoplastic polymer layer disposed on a part of one or both sides of the substrate, and the method comprises a step of inspecting a surface of the separator, the separator being inspected using an inspection device having a camera and a light source that irradiates light onto the inspection portion of the separator at an incident angle θ of 60° to 90°.

The method for producing a separator according to the second embodiment includes an inspection step in which the surface of the separator with a thermoplastic polymer layer (thermoplastic polymer-containing layer) is inspected using an inspection device similar to the first embodiment, and in the inspection step, a form and/or coverage ratio of the thermoplastic polymer layer is detected from an image photographed by the camera of the inspection device.

The inspection method by the method for producing a separator is an inspection method using oblique illumination in the step of inspecting the surface of the separator (inspection portion of the separator), wherein the area and/or form of the pattern on the thermoplastic polymer layer (thermoplastic polymer-containing layer) of the coated and dried separator is measured and the quality is assessed as to whether the quality is good or poor. Specifically, by irradiating light onto the thermoplastic polymer-containing layer to be inspected, at an incident angle θ of 60° to 90°, it is possible to highlight contrast in the thermoplastic polymer-containing layer and allow the pattern-coated sections to be discerned, thereby making it possible to precisely and efficiently measure the area (such as coverage ratio) and/or form of the pattern of the thermoplastic polymer-containing layer formed on the separator.

By appropriately selecting the parameters for the separator as explained below, it is possible to further highlight contrast in the thermoplastic polymer-containing layer during photoirradiation to more reliably discern the pattern-coated sections, thereby allowing more precise and efficient measurement of the area or form of the pattern in the thermoplastic polymer-containing layer formed on the separator. This allows a separator with high reliability to be efficiently produced according to the invention.

[Inspection Device]

One aspect of the invention provides an inspection device.

The inspection device according to a third embodiment is an inspection device for a separator having a thermoplastic polymer layer, wherein the separator comprises a substrate and the thermoplastic polymer layer disposed on a part of one or both sides of the substrate, and the inspection device has a camera and a light source that irradiates light onto an inspection portion of the separator at an incident angle θ of 60° to 90°.

Figure 2:
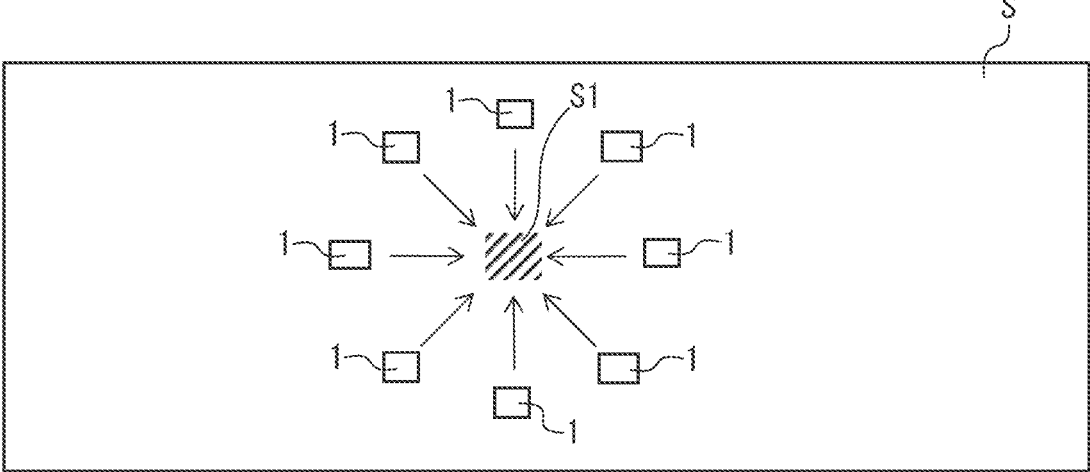
FIG. 2 is a top view of an example of an inspection device.
Figure 3:
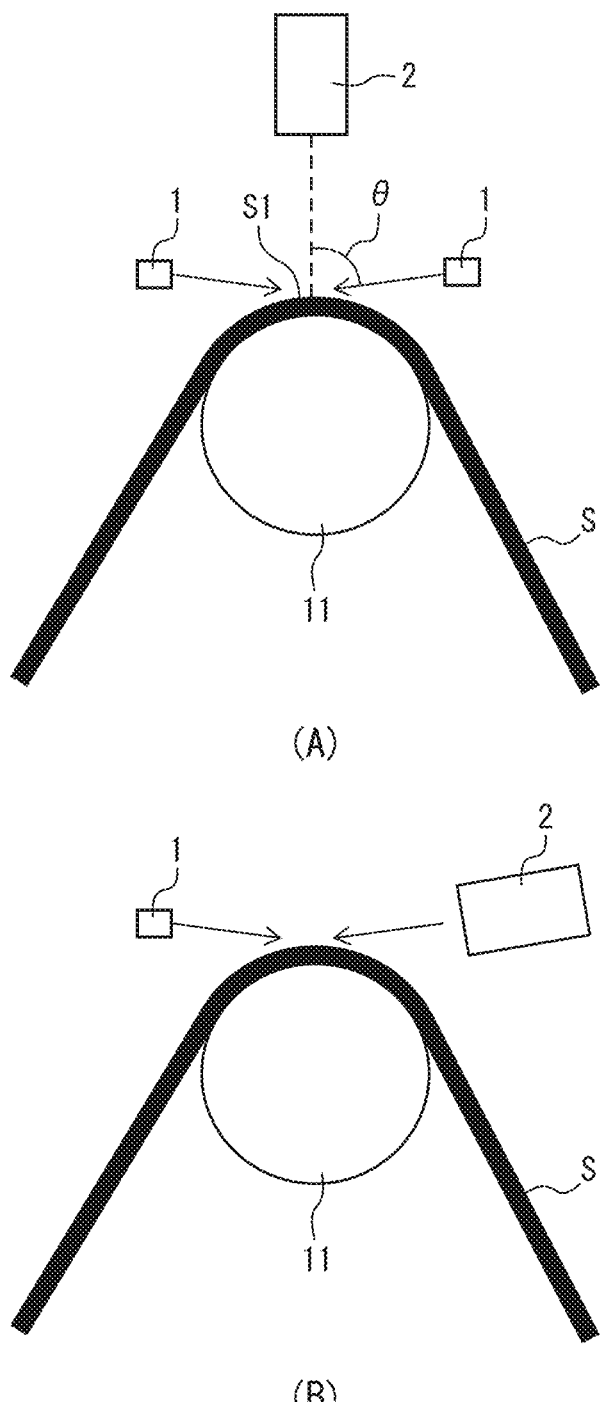
FIG. 3 is a side view of an example of an inspection device.

FIG. 1 to FIG. 3 are diagrams showing examples of the configuration of an inspection device that carries out inspection of a separator by the production method of the invention. The inspection device has a light source 1 and a camera 2. Photographing and inspection of the surface of the separator S may be inspection on a manufacturing line (online inspection) or inspection separate from the manufacturing line (offline inspection).

The light source 1 serves to irradiate light onto the surface of the separator S. The type of light source 1 is not particularly restricted, and a fluorescent lamp, mercury lamp or LED may be used. An LED is preferred from the standpoint of light source stability. Any wavelength may be selected when an LED is used as the light source 1, but a wavelength of 630 nm is preferably used from the viewpoint of highlighting contrast of the pattern in the thermoplastic polymer layer.

The incident angle θ of light from the light source 1 onto the inspection portion S1 of the separator S is 60° to 90°, preferably 75° or greater and less than 90° and more preferably 80° or greater and less than 90°, where 0° is the direction perpendicular to the planar direction of the separator S. By setting the incident angle θ for light from the light source 1 to be within this range, it is possible to highlight irregularities in the pattern of the thermoplastic polymer layer to more clearly project contrast in the pattern of the thermoplastic polymer layer and provide more reliable inspection. A separator disposed on a roll has 0° for the direction perpendicular to the tangent line of the inspection portion S1.

If the incident angle θ of light from the light source 1 is smaller than 60° with respect to the plane of the separator S, then irregularities in the pattern of the thermoplastic polymer layer will not be distinctly delineated and contrast in the pattern of the thermoplastic polymer layer will fail to be clearly projected, resulting in insufficient inspection precision. If the incident angle θ is greater than 90°, it will not be possible to irradiate a sufficient amount of light onto the inspection portion S1, making it impossible to obtain a clear image.

The distance from the light source 1 to the surface of the separator S is preferably 500 mm or less, more preferably 300 mm or less and even more preferably 100 mm or less. If the distance from the light source 1 to the separator S is close it will be possible to image the pattern of the thermoplastic polymer layer at high resolution.

The number of light sources 1 used is not particularly restricted, but using two or more light sources 1 is preferred for irradiating the inspection portion S1 of the separator S from different directions. Specifically, as shown in the top view of FIG. 2, two or more light sources 1 are preferably disposed at equal spacings surrounding the inspection portion S1 of the separator S (indicated as diagonal lines in the drawing). FIG. 2 shows an example of using eight light sources 1. By irradiating light evenly from a plurality of light sources 1, it is possible to more evenly spread out shadows from the pattern of the thermoplastic polymer layer to more clearly project contrast in the pattern of the thermoplastic polymer layer and provide more reliable inspection. The number of light sources 1 is preferably no greater than 50 from the viewpoint of space.

The form of the light source 1 is not particularly restricted and may be a flexible form that produces a spherical, rod-shaped or circular arc form. The size of the light source 1 is also not particularly restricted, but preferably the single-side length or diameter is 1 mm to 3000 mm. When two or more light sources 1 are not disposed, it is preferred to use light sources having a single-side length or diameter of 100 mm to 3000 mm, and it is more preferred to use light sources having a single-side length or diameter of 200 mm to 1500 mm. By adjusting the single-side length or diameter of the light source to be 100 mm or greater it is possible to reduce the effects of shadows on the pattern portion of the thermoplastic polymer layer, and by adjusting it to 3000 mm or smaller it is possible to reduce the space required for installation of the inspection unit.

The camera 2 is not particularly restricted, and any commercially available camera may be used, preferably being a CCD image sensor or CMOS image sensor. A CMOS image sensor is preferably used from the viewpoint of resolving power. The resolution of the camera 2 is not particularly restricted, but a camera with 1,000,000 or more pixels is preferred for more detailed observation of the pattern.

The distance from the camera 2 to the surface of the separator S (inspection portion of the separator) may have any value so long as an image of the surface is detected. The distance is preferably 10 mm to 3000 mm. When the inspection unit is installed online, the distance is preferably set to be 250 mm to 2000 mm, and more preferably 500 mm to 1000 mm. If the distance from the camera to the surface of the separator S is set to be at least 250 mm, then it will be less likely to contact the separator when the position of the separator shifts while moving. By setting the distance to be 3000 mm or less it is possible to create a focal length suitable for the resolving power of the camera.

The position of the camera 2 is not particularly restricted, but if the direction perpendicular to the planar direction of the separator S is defined as 0°, then photographed images are preferably taken at angles of 0° or larger (FIG. 3(A)) and/or 90° or smaller (FIG. 3(B)). The upper limit for the angle is preferably 75° or smaller and even more preferably 60° or smaller. By setting the camera 2 within this range it is possible to reduce error caused by shadows of the pattern, and to accomplish more precise inspection. When the inspection unit is installed online and light is irradiated with an incident angle θ and an angle of reflection θ onto the separator surface being inspected by the light source, the camera is preferably set at an angle in the range of −5° to +5° with respect to the angle of reflection. Setting at such a position can increase the sensitivity of the camera 2 to allow application for inspection of separators that are conveyed at high speed.

The camera 2 is preferably anchored on a specialized mount. The mount preferably has a stage that is movable in any one or two or more directions from among forward-backward, right-left and up-down, in order to allow adjustment to an appropriate position for each inspection.

When inspection is carried out online, the conveyed separator S may be photographed at a section in contact with the roll 11 as shown in FIG. 3(A) or FIG. 3(B), or at a section that is not in contact with the roll 11, but preferably it is observed on the roll 11 in order to eliminate blurring of the camera focus. When observation is on the roll 11, the diameter of the roll 11 is preferably 10 mm or greater, more preferably 30 mm or greater and even more preferably 50 mm or greater. A larger diameter of the roll 11 results in a smaller curvature of the inspection portion S1 of the surface of the separator S, making the photographed image less likely to be blurred.

When photographing is offline, the separator S may be placed on the stage 10 for photographing, or it may be photographed while raised above the stage 10, but from the viewpoint of keeping the separator S at rest it is preferably photographed while placed on the stage 10. When the separator S is to be inspected on the stage 10, a glass plate is preferably placed on the separator S for inspection from the viewpoint of keeping the separator S at rest without wrinkling.

From the viewpoint of maintaining a constant surface condition for the inspection portion S1, it is also preferred to use an adsorption stage which is provided with a suction hole in the stage 10 and a suction unit below the stage 10, and causes the separator S to be adsorbed by air suction.

The image photographed by the camera 2 is processed by image processing software and the photographed pattern is binarized with 256 shading. This will distinguish between the portions of the surface of the separator S covered with the thermoplastic polymer layer and the portions not covered with the thermoplastic polymer layer. The separated portions are measured for area and length (form) using image processing software.

Commercially available image processing software may be used, such as ImageJ software.

The area and/or form of the pattern of the thermoplastic polymer layer on the separator is measured in this manner, and the quality is assessed according to a predetermined standard. When the separator has been assessed as poor, the production conditions for the thermoplastic polymer layer, including the coating conditions, drying time and temperature, are preferably reset to appropriate ranges. Separators that have been assessed as poor are marked and separated from separators that have been assessed as good, and removed from the manufacturing line.

According to the first or second embodiment, when the thermoplastic polymer layer is continuously coated onto a separator strip using a coating machine, the area and/or form of the thermoplastic polymer layer after drying may be continuously measured under the conditions described above at predetermined time intervals, and the quality assessed.

For example, if each incident angle θ with respect to the plane of the separator is in the range of 60° to 90° (preferably 75° or greater and less than 90°), then the area and/or form of the pattern of the thermoplastic polymer layer of the separator is continuously measured at predetermined time intervals, assessing as good any separators wherein the area and/or form of the pattern that is continuously measured consistently satisfies a reference. According to the first or second embodiment, therefore, it is possible to carry out inspection online during continuous coating.

The method according to the first or second embodiment, whereby the area and/or form of the thermoplastic polymer layer is measured and it is evaluated whether or not the thermoplastic polymer layer is suitably formed on the separator surface according to the pattern, exhibits the following effects. (1) The method is simple and does not require use of special equipment, (2) it is possible to evaluate whether or not the thermoplastic polymer layer has been suitably formed in a short period of time without destruction of the separator, (3) being a rapid and convenient method that allows evaluation in a non-destructive manner, it allows quality to be confirmed online during the separator manufacturing steps, and (4) since quality can be confirmed online, it is possible to obtain feedback on the production conditions such as the coating conditions, drying temperature and drying time.

Inspection or production of the separator is carried out with a step of feedback using the results of a pass/fail assessment for the separator based on the results of inspected area (such as coverage ratio) and/or form. In the pass/fail assessment, "fail" is assessed if the predetermined standard is not satisfied. By including a feedback step it is possible to efficiently promote auto-assessment by AI.

The separator obtained after the inspection step may if necessary be worked into predetermined dimensions for manufacture of the separator.

Since the area and/or form of the pattern of the thermoplastic polymer layer of the separator surface is thus measured after coating and drying the thermoplastic polymer layer, the method for evaluating the quality of the thermoplastic polymer layer is convenient, while also allowing evaluation without destruction of the separator, and thus contributes to more manageable development and production steps for excellent separators.

This allows a separator with high reliability to be efficiently produced according to the invention.
<Separator>

The separator inspected by the inspection method described above is a separator for an electrical storage device, and it comprises a substrate and a thermoplastic polymer layer (thermoplastic polymer-containing layer) formed on at least one side of the substrate. A mode having the thermoplastic polymer-containing layer formed on only one side of the separator and a mode having the thermoplastic polymer-containing layer formed on both sides of the separator are both within the scope of the invention. The separator according to the first or second embodiment may also have an inorganic filler layer (inorganic filler porous layer) present on one or both sides of the substrate, in which case part of the surface of the inorganic filler layer will be covered by the thermoplastic polymer.

By appropriately selecting the parameters for the separator for the first or second embodiment, it is possible to highlight contrast of the pattern-coated section to allow discernment of the pattern in the inspection method described above, thereby allowing precise and efficient measurement of the area and/or form of the pattern in the thermoplastic polymer-containing layer formed on the separator.

Preferred embodiments of each of the members used to form the separator will now be described in detail.
[Substrate]

The substrate may be any one that has been used as a separator in the prior art. The substrate is preferably a porous film, and more preferably a porous film that has fine pore diameters, and that is ion-conductive without electrical conductivity and has high resistance to organic solvents. Examples of such porous membranes include microporous membranes composed mainly of polyolefin-based resins (for example, polyethylene, polypropylene, polybutene and polyvinyl chloride) or mixtures or copolymers of the monomers; microporous membranes composed mainly of resins such as polyethylene terephthalate, polycycloolefin, polyethersulfone, polyamide, polyimide, polyimideamide, polyaramid, polycycloolefin, nylon and polytetrafluoroethylene; and woven polyolefin-based fibers (woven fabrics), nonwoven fabrics of polyolefin-based fibers, paper, and aggregates of insulating material particles. They may be used alone or optionally as combinations of two or more types.

Preferred among these are polyolefin microporous membranes composed mainly of polyolefin-based resins, from the viewpoint of further reducing the film thickness of the separator, increasing the proportion of active material in the electrical storage device and thus increasing the capacity per volume. A polyolefin microporous membrane is advantageous for further reducing the thickness of the separator since coatability of the coating solution will be excellent in the step of applying the coating solution onto the film.

Being "composed mainly of" a polyolefin-based resin means that it is included at greater than 50 weight % with respect to the total weight of the substrate. When a polyolefin microporous membrane is used as the substrate, the polyolefin resin content of the polyolefin microporous membrane is not particularly restricted. From the viewpoint of shutdown performance when used as a separator, however, the polyolefin resin preferably constitutes 50 weight % to 100 weight % of the total components of the polyolefin microporous membrane. The polyolefin resin content is preferably 75 weight % or greater, more preferably 85 weight % or greater, even more preferably 90 weight % or greater, yet more preferably 95 weight % or greater and most preferably 98 weight % or greater, or even 100 weight %, of the total components of the polyolefin microporous membrane.

The polyolefin resin is not particularly restricted and may be a common polyolefin resin to be used for extrusion, injection, inflation or blow molding. Examples of polyolefin resins include homopolymers where the monomer is ethylene, propylene, 1-butene, 4-methyl-1-pentene, 1-hexene or 1-octene, as well as copolymers or multistage polymers of two or more of these monomers. Such homopolymers, copolymers and multistage polymers may be used alone or in combinations of two or more.

Typical examples of polyolefin resins include, but are not restricted to, polyethylene, polypropylene and polybutene, and more specifically low-density polyethylene, linear low-density polyethylene, medium-density polyethylene, high-density polyethylene, ultrahigh molecular weight polyethylene, isotactic polypropylene, atactic polypropylene, ethylene-propylene random copolymer, polybutene and ethylene-propylene rubber. They may be used alone or optionally as combinations of two or more types. From the viewpoint of the shutdown property which represents the degree to which the pores become occluded by heat-fusion, the polyolefin resin is preferably polyethylene, such as low-density polyethylene, linear low-density polyethylene, medium-density polyethylene, high-density polyethylene or ultrahigh molecular weight polyethylene. High-density polyethylene is particularly preferred for its low melting point and high strength, and polyethylene having a density of 0.93 g/cm$^3$ or greater as measured according to JIS K 7112 is more preferred. The polymerization catalyst used for production of the polyethylene is not particularly restricted, and examples include Ziegler-Natta catalysts, Phillips catalysts and metallocene-based catalysts. Polyethylene is more preferably the main component from the viewpoint of controlling the balance between low melting point, high strength, permeability and thermal properties.

For improved heat resistance of the substrate, it is more preferred to use a polyolefin microporous membrane comprising polypropylene and a polyolefin resin other than polypropylene. The spatial structure of the polypropylene is not restricted, and it may be isotactic polypropylene, syndiotactic polypropylene or atactic polypropylene. Examples of polyolefin resins other than polypropylene include homopolymers of monomers such as ethylene, 1-butene, 4-methyl-1-pentene, 1-hexene and 1-octene, as well as copolymers and multistage polymers of two or more of these monomers, with specific examples including those already mentioned above. The polymerization catalyst used for production of the polypropylene is not particularly restricted, and examples include Ziegler-Natta catalysts and metallocene-based catalysts.

The content ratio of polypropylene with respect to the total amount of polyolefins in the polyolefin microporous membrane (polypropylene/polyolefin) is not particularly restricted, but from the viewpoint of both heat resistance and a satisfactory shutdown function, it is preferably 1 to 35 weight %, more preferably 3 to 20 weight % and even more preferably 4 to 10 weight %. From the same viewpoint, the content ratio of olefin resins other than polypropylene, such as polyethylene, with respect to the total amount of polyolefins in the polyolefin microporous membrane (olefin resins other than polypropylene/polyolefin) is preferably 65 to 99 weight %, more preferably 80 to 97 weight % and even more preferably 90 to 96 weight %.

Specific examples of polyolefin resins other than polyethylene and polypropylene include polybutene and ethylene-propylene random copolymers.

The viscosity-average molecular weight of the polyolefin resin composing the polyolefin microporous membrane is not particularly restricted, but is preferably 30,000 to 12,000,000, more preferably 50,000 or greater and less than 2,000,000, and even more preferably 100,000 or greater and less than 1,000,000. If the viscosity-average molecular weight is 30,000 or greater, the melt tension during melt molding will increase, resulting in more satisfactory moldability, while the strength will also tend to be high due to entanglement between the polymers. If the viscosity-average molecular weight is 12,000,000 or lower, on the other hand, it will be easier to accomplish uniform melt kneading, and the sheet moldability, and especially its thickness stability, will tend to be superior. The viscosity-average molecular weight is also preferably lower than 1,000,000 because the pores will be easily occluded during temperature increase, and a more satisfactory shutdown function will tend to be obtained. The viscosity-average molecular weight (Mv) is calculated based on ASTM-D4020 from the following formula, using decalin as the solvent, the limiting viscosity [η] being measured at 135° C.

$$\text{Polyethylene: } [\eta]=6.77\times10^{-4}\ Mv^{0.67} \qquad \text{(Chiang formula)}$$

$$\text{Polyethylene: } [\eta]=1.10\times10^{-4}\ Mv^{0.80}$$

For example, instead of using only a polyolefin with a viscosity-average molecular weight of lower than 1,000,000, a mixture of a polyolefin with a viscosity-average molecular weight of 2,000,000 and a polyolefin with a viscosity-average molecular weight of 270,000 may be used, in such a proportion that the viscosity-average molecular weight of the mixture is lower than 1,000,000.

The substrate may also comprise optional additives. Such additives are not particularly restricted and examples include polymers other than polyolefins; inorganic particles; phenol-based, phosphorus-based and sulfur-based antioxidants; metal soaps such as calcium stearate and zinc stearate; ultraviolet absorbers; light stabilizers; antistatic agents; anti-fogging agents; and color pigments. The total content of additives is no greater than 20 parts by weight, more preferably no greater than 10 parts by weight and even more preferably no greater than 5 parts by weight, with respect to 100 parts by weight of the polyolefin resin in the polyolefin microporous membrane.

The porosity of the substrate is not particularly restricted and is preferably 20% or greater, more preferably 30% or greater and even more preferably greater than 35%. The porosity is also preferably 80% or lower and more preferably 70% or lower. The porosity is preferably 20% or greater from the viewpoint of more effectively and reliably ensuring the permeability of the separator. The porosity is also preferably 80% or lower from the viewpoint of more effectively and reliably ensuring puncture strength. The porosity can be calculated by the following formula:

$$\text{Porosity}=(\text{volume}-\text{mass/film density})/\text{volume}\times100,$$

based on the volume (cm³), mass (g) and film density (g/cm³) of a measuring sample of the substrate. When the polyolefin microporous membrane is composed of polyethylene, for example, calculation may be performed assuming a film density of 0.95 (g/cm³). The porosity can be adjusted by changing the stretch ratio of the polyolefin microporous membrane. If the porosity of the substrate is within this range, contrast between the substrate and the pattern of the thermoplastic polymer layer will be satisfactory during inspection of the separator surface by the inspection method described above, making it possible to carry out more reliable inspection.

The air permeability of the substrate is not particularly restricted, but it is preferably 10 seconds/100 cm³ or greater, more preferably 50 seconds/100 cm³ or greater, and also preferably 1000 seconds/100 cm³ or lower and more preferably 500 seconds/100 cm³ or lower. The air permeability is preferably 10 seconds/100 cm³ or greater from the viewpoint of minimizing self-discharge of the electrical storage device. The air permeability is also preferably 1000 seconds/100 cm³ or lower from the viewpoint of obtaining a satisfactory charge-discharge characteristic. The air permeability is the air permeability resistance measured according to JIS P-8117. The air permeability can be adjusted by changing the stretching temperature and/or stretch ratio of the substrate.

The mean pore size of the substrate is preferably 0.15 μm or lower and more preferably 0.1 μm or lower, and also preferably 0.01 μm or greater. A mean pore size of 0.15 μm or lower is preferred from the viewpoint of minimizing self-discharge of the electrical storage device and helping to prevent reduction in capacity. The mean pore size can be adjusted by changing the stretch ratio during production of the substrate.

The puncture strength of the substrate is not particularly restricted, but is preferably 200 gf/20 μm or greater, more preferably 300 gf/20 μm or greater and even more preferably 400 gf/20 μm or greater, and also preferably 2000 gf/20 μm or lower and more preferably 1000 gf/20 μm or lower. The puncture strength is preferably 200 gf/20 μm or greater from the viewpoint of minimizing film rupture when the active material is shed during winding of the separator with the electrodes, and from the viewpoint of concerns regarding short circuiting by expansion and contraction of the electrodes that occurs with charge-discharge. On the other hand, the puncture strength is preferably 2000 gf/20 μm or lower from the viewpoint of reducing width contraction caused by relaxation of orientation during heating. The puncture strength is measured by the method described in the Examples. The puncture strength can be adjusted by setting the stretch ratio and/or stretching temperature of the substrate.

The thickness of the substrate is not particularly restricted, but is preferably 2 μm or greater and more preferably 5 μm or greater, and also preferably 100 μm or smaller, more preferably 60 μm or smaller and even more preferably 50 μm or smaller. The film thickness is preferably 2 μm or greater from the viewpoint of increasing the mechanical strength. The film thickness is also 100 μm or smaller because this will reduce the volume of the electrical storage device occupied by the separator, which is advantageous for increasing the capacity of the electrical storage device.

[Thermoplastic Polymer-Containing Layer]

The thermoplastic polymer-containing layer comprises a thermoplastic polymer. The thermoplastic polymer-containing layer may be disposed over all or only a portion of the surface of the substrate. The thermoplastic polymer-containing layer is more preferably disposed on only a portion of the substrate surface so that the obtained electrical storage device can exhibit high ion permeability.

The thermoplastic polymer-containing layer is intended to be directly bonded to an electrode. One or more thermoplastic polymer-containing layers provided on the separator are preferably disposed so as to be directly bonded with an electrode, i.e. so that at least part of the substrate is bonded with an electrode through the thermoplastic polymer-containing layer.

The amount of thermoplastic polymer-containing layer coated on the substrate, that is, the amount of thermoplastic polymer-containing layer applied per area on one side of the substrate, is preferably 0.01 g/m$^2$ or greater and more preferably 0.03 g/m$^2$ or greater, in terms of solid content. The coating amount is also preferably 2.0 g/m$^2$ or less and more preferably 1.5 g/m$^2$ or less. The coating amount is preferably 0.01 g/m$^2$ or greater from the viewpoint of increasing the adhesive force between the thermoplastic polymer-containing layer of the separator and the electrodes, obtaining more uniform charge-discharge, and improving the device properties (such as the battery cycle characteristic). The coating amount is also preferably 2.0 g/m$^2$ or less from the viewpoint of further minimizing reduction in ion permeability.

The area ratio of the thermoplastic polymer-containing layer with respect to the total area of the surface of the substrate on the side on which the thermoplastic polymer-containing layer is disposed, i.e. the area coverage ratio of the thermoplastic polymer-containing layer with respect to the substrate, is preferably 95% or lower, more preferably 80% or lower, even more preferably 50% or lower and most preferably 35% or lower. The surface coverage ratio is also preferably 5% or greater, more preferably 10% or greater and most preferably 15% or greater. The area coverage ratio is preferably 95% or lower from the viewpoint of increasing the ion permeability and improving the rate property. This can also help to ensure the desired output. The area coverage ratio is also preferably 50% or lower from the viewpoint of ensuring blocking resistance by increasing the contact area between the exposed sections of the substrate surface (the sections where the thermoplastic polymer-containing layer is not present) and a separate substrate or separate thermoplastic polymer-containing layer when the separator alone is wound. It is also preferred from the viewpoint of further minimizing occlusion of the pores of the substrate by the thermoplastic polymer and further increasing the permeability of the separator. The area coverage ratio is also preferably 5% or greater from the viewpoint of further increasing adhesion with electrodes.

The area coverage ratio can be adjusted by varying the type or polymer concentration of the thermoplastic polymer in the coating solution applied onto the surface of the substrate, or the coating solution coating amount or coating method and the coating conditions, in the method for producing a separator described below. Methods for adjusting the coating area are not limited to these.

Figure 4:
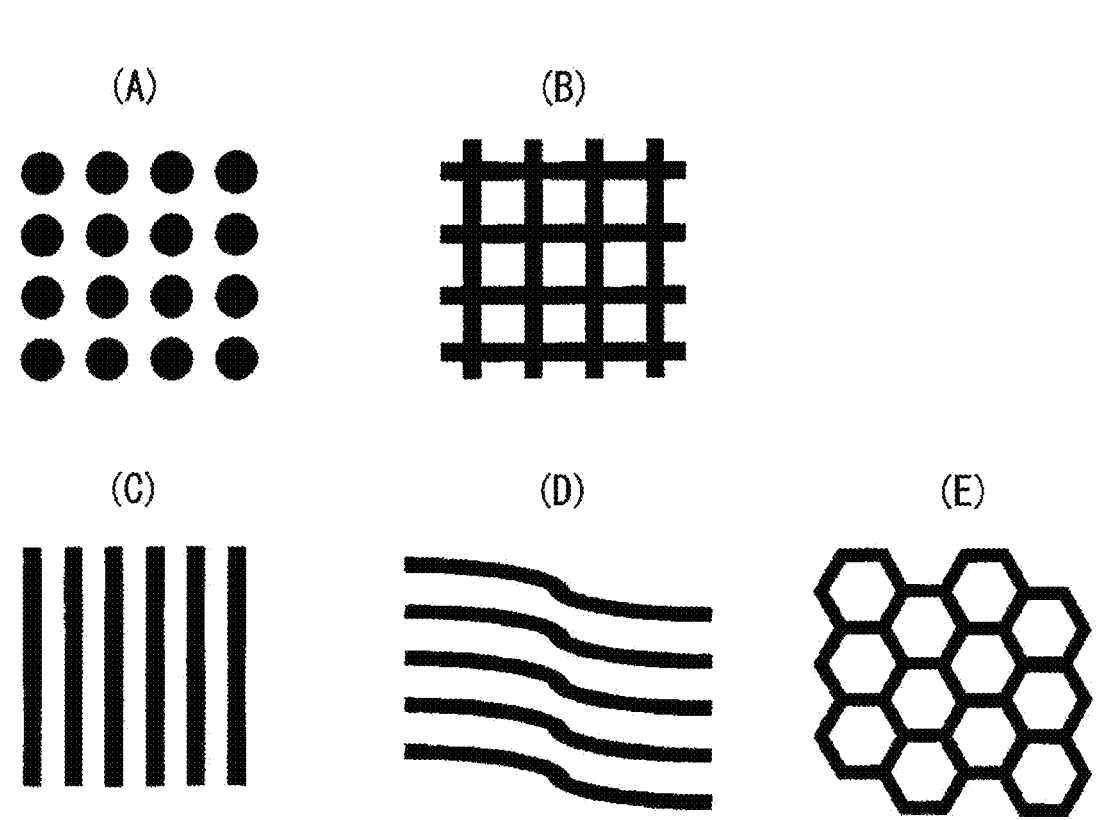
FIG. 4 is a diagram showing examples of arrangement patterns for a thermoplastic polymer.

When the thermoplastic polymer-containing layer is disposed on only one side of the substrate, the form (pattern) in which the thermoplastic polymer is provided is not particularly restricted, although it is preferably a fixed pattern (unit pattern) that is periodic (repeating) at a certain frequency. When the thermoplastic polymer is present in a fixed pattern in a periodic manner with a certain frequency, the arrangement pattern may be (A) dotted, (B) lattice-like, (C) striped, (D) banded or (E) hexagonal as shown in FIG. 4, or a combination thereof. A dotted pattern is preferred among these from the viewpoint of filling the electrolyte solution, and from the viewpoint of productivity.

The size of the unit pattern composing the pattern of the thermoplastic polymer is preferably 10 μm×10 μm to 10 mm×10 mm. A unit pattern size of 10 μm or greater will allow observation at a low magnification factor and will ensure adequate working efficiency during inspection of the separator surface by the inspection method described above. If the size of the unit pattern is 10 mm or smaller, the resulting photographs will have a low degree of error for typical values.

A unit pattern in a dotted form, for example, preferably has dot diameters of 50 μm or greater, more preferably 100 μm or greater and even more preferably 200 μm or greater. The dot diameters are also preferably 1 mm or smaller and more preferably 500 μm or smaller. If the dot diameters are 50 μm or greater the flow of ions in the electrolyte solution will be more satisfactory, resulting in even more excellent permeability. If the dot diameters are 1 mm or smaller it will be possible to more evenly bond the separator to the electrodes, allowing the in-plane current density to be made even more uniform. By providing portions of the dotted arrangement pattern that are not coated with the thermoplastic polymer it is possible to create a more uniform current density within the plane.

The thermoplastic polymer-containing layer is preferably disposed in a partial manner as the area coverage ratio will be more uniform throughout a given area range. Specifically, for an observation field range of at least 2 mm×2 mm when the surface of the separator is observed by SEM, the rate of change of the area coverage ratio as represented by the following formula is preferably within ±50%.

$$\text{Area Coverage Ratio Rate of Change (\%)} = (C1-C2)/C1 \times 100$$

Here, C1 represents the area coverage ratio in an arbitrary observation field of 2 mm×2 mm or greater, and C2 represents the area coverage ratio in another observation field of 2 mm×2 mm or greater. For example, with a separator having the thermoplastic polymer-containing layer disposed in a partial manner, if the value measured for the area coverage ratio in an observation field of 2 mm×2 mm is 50%, then the area coverage ratio in an observation field of 10 mm×10 mm is preferably 25% to 75% when observing any other section of the separator.

The thickness of the thermoplastic polymer-containing layer is preferably 0.01 μm or greater and more preferably 0.1 µm or greater, on each side of the substrate. The thickness of the thermoplastic polymer-containing layer is also preferably 10.0 µm or smaller and more preferably 5.0 µm or smaller, on each side of the substrate. A thickness of 0.01 µm or greater is preferred from the viewpoint of obtaining uniform adhesive force between the electrodes and the substrate, thus resulting in improved device properties. A thickness of 10.0 µm or smaller is preferred from the viewpoint of inhibiting reduction in ion permeability. The thickness of the thermoplastic polymer-containing layer can be adjusted by varying the type or polymer concentration of the thermoplastic polymer in the coating solution to be coated onto the substrate, the amount of coating solution applied, the coating method and the coating conditions. The method of adjusting the thickness is not limited to these, however. The thickness of the thermoplastic polymer-containing layer is measured by the method described in the Examples.

(Particulate Polymer)

The thermoplastic polymer in the thermoplastic polymer-containing layer preferably includes a particulate polymer compound (particulate polymer). The term "ethylenic unsaturated monomer" as used herein means a monomer with one or more ethylenic unsaturated bonds in the molecule. By including a particulate polymer in the thermoplastic polymer, the adhesive force for electrodes and the ion permeability can both be excellent.

In particular, including a particulate polymer in the thermoplastic polymer can promote scattering of light irradiated onto the thermoplastic polymer layer during inspection of the separator surface by the inspection method described above, while also providing satisfactory contrast at the pattern sections, between the substrate or inorganic filler layer and the thermoplastic polymer layer, thus allowing more reliable inspection.

Specific examples of particulate polymers resins include acrylic polymers, conjugated diene-based polymers, acrylic polymers, polyvinyl alcohol-based resins and fluorine-containing resins. Acrylic polymers are preferred among these from the viewpoint of latex adhesion and permeability. Acrylic polymers and fluorine-containing resins are preferred from the viewpoint of voltage endurance, while conjugated diene-based polymers are preferred from the viewpoint of compatibility with electrodes. From the viewpoint of exhibiting the function and effect of the invention more effectively and reliably, the particulate polymer preferably includes a particulate copolymer. A single type of particulate polymer may be used alone, or two or more may be used in combination.

The thermoplastic polymer in the thermoplastic polymer-containing layer includes a particulate polymer at preferably 60 weight % or greater, more preferably 90 weight % or greater, even more preferably 95 weight % or greater and most preferably 98 weight % or greater, with respect to the total amount. The thermoplastic polymer-containing layer may also include a thermoplastic polymer other than a particulate polymer in an amount that does not interfere with the effect of the invention.

A conjugated diene-based polymer is a polymer having a conjugated diene compound as a monomer unit. Examples of conjugated diene compounds include 1,3-butadiene, 2-methyl-1,3-butadiene, 2,3-dimethyl-1,3-butadiene, 2-chlor-1,3-butadiene, substituted straight-chain conjugated pentadienes and substituted or side chain-conjugated hexadienes, any of which may be used alone or in combinations of two or more. A particularly preferred example is 1,3-butadiene. The conjugated diene-based polymer may also include a (meth)acrylic compound or other monomer as a monomer unit. Examples of such monomers include styrene-butadiene copolymer and its hydrogenated forms, acrylonitrile-butadiene copolymer and its hydrogenated forms, and acrylonitrile-butadiene-styrene copolymer and its hydrogenated forms.

Examples of polyvinyl alcohol-based resins include polyvinyl alcohol and polyvinyl acetate. Examples of fluorine-containing resins include polyvinylidene fluoride, polytetrafluoroethylene, vinylidene fluoride-hexafluoropropylene copolymer, vinylidene fluoride-hexafluoropropylene-tetrafluoroethylene copolymer and ethylene-tetrafluoroethylene copolymer.

The acrylic polymer is a polymer having a (meth)acrylic compound as a polymerizing unit, i.e. as a monomer unit. A (meth)acrylic compound is at least one compound selected from the group consisting of (meth)acrylic acid and (meth)acrylic acid esters. Examples of such compounds include compounds represented by the following formula.

$$CH_2=CR_{Y1}-COO-R^{Y2}$$

In the formula, $R^{Y1}$ represents a hydrogen atom or a methyl group, and $R^{Y2}$ represents a hydrogen atom or a monovalent hydrocarbon group. When $R^{Y2}$ is a monovalent hydrocarbon group, it may be substituted, or it may have a heteroatom in the chain. Examples of monovalent hydrocarbon groups include straight-chain and branched linear alkyl, cycloalkyl and aryl groups. Examples of substituents include hydroxyl and phenyl groups and examples of heteroatoms include halogen and oxygen atoms. A single (meth)acrylic compound may be used alone, or two or more may be used in combination. Such (meth)acrylic compounds include (meth)acrylic acid, linear alkyl (meth)acrylates, cycloalkyl (meth)acrylates, (meth)acrylates with hydroxyl groups, and (meth)acrylates with phenyl groups.

More specifically, linear alkyl groups with one type of $R^{Y2}$ include C1 to 3 linear alkyl groups such as methyl, ethyl, n-propyl and isopropyl groups; and n-butyl, isobutyl, t-butyl, n-hexyl and 2-ethylhexyl groups; as well as C4 and greater linear alkyl groups such as lauryl groups. Examples of aryl groups for one type of $R^{Y2}$ include phenyl groups. Specific examples of (meth)acrylic acid ester monomers with such $R^{Y2}$ groups include (meth)acrylates with linear alkyl groups such as methyl acrylate, ethyl acrylate, propyl acrylate, isopropyl acrylate, butyl acrylate, isobutyl acrylate, t-butyl acrylate, n-hexyl acrylate, 2-ethylhexyl acrylate, lauryl acrylate, methyl methacrylate, ethyl methacrylate, propyl methacrylate, isopropyl methacrylate, butyl methacrylate, isobutyl methacrylate, t-butyl methacrylate, n-hexyl methacrylate, 2-ethylhexyl methacrylate and lauryl methacrylate; and (meth)acrylates with aromatic rings such as phenyl (meth)acrylate and benzyl (meth)acrylate.

Preferred among these are monomers with C4 and greater linear alkyl groups, and more specifically (meth)acrylic acid ester monomers wherein $R^{Y2}$ is a linear alkyl group of 4 or more carbon atoms, from the viewpoint of improving adhesion of the separator onto electrodes (electrode active materials). More specifically, it is preferably at least one selected from the group consisting of butyl acrylate, butyl methacrylate and 2-ethylhexyl acrylate. The upper limit for the number of carbon atoms of the C4 or greater linear alkyl group is not particularly restricted, and it may be 14, for example, but is preferably 7. These (meth)acrylic acid ester monomers may be used alone, or two or more may be used in combination.

The (meth)acrylic acid ester monomer also preferably includes a monomer with a cycloalkyl group as $R^{Y2}$, either instead of or in addition to the monomer with a C4 or greater linear alkyl group. This can also help to further improve adhesion of the separator for electrodes. Monomers with such cycloalkyl groups include, as more specific examples, cyclohexyl (meth)acrylate, isobornyl (meth)acrylate and adamantyl (meth)acrylate. The number of carbon atoms composing the alicyclic ring of the cycloalkyl group is preferably 4 to 8, more preferably 6 or 7, and most preferably 6. The cycloalkyl group may be either substituted or unsubstituted. Examples of substituents include methyl and t-butyl groups. Preferred among these are one or more selected from the group consisting of cyclohexyl acrylate and cyclohexyl methacrylate, from the viewpoint of obtaining satisfactory polymerization stability when preparing the acrylic polymer. They may be used alone or optionally as combinations of two or more types.

The acrylic polymer also preferably includes a crosslinkable monomer as a (meth)acrylic acid ester monomer, either instead of or in addition to, but preferably in addition to, those mentioned above. There are no particular restrictions on the crosslinkable monomer, and examples include monomers with two or more radical-polymerizing double bonds, and monomers with a functional group that provides a self-crosslinking structure either during or after polymerization. They may be used alone or optionally as combinations of two or more types.

Examples of monomers with two or more radical-polymerizing double bonds include divinylbenzene and polyfunctional (meth)acrylates. A polyfunctional (meth)acrylate may be one or more types selected from the group consisting of bifunctional (meth)acrylates, trifunctional (meth)acrylates and tetrafunctional (meth)acrylates. Specific examples include polyoxyethylene diacrylate, polyoxyethylene dimethacrylate, polyoxypropylene diacrylate, polyoxypropylene dimethacrylate, neopentyl glycol diacrylate, neopentyl glycol dimethacrylate, butanediol diacrylate, butanediol dimethacrylate, trimethylolpropane triacrylate, trimethylolpropane trimethacrylate, pentaerythritol tetraacrylate and pentaerythritol tetramethacrylate. They may be used alone or optionally as combinations of two or more types. From the same viewpoint as above, trimethylolpropane triacrylate and/or trimethylolpropane trimethacrylate is preferred.

Examples of monomers with functional groups that provide self-crosslinking structures either during or after polymerization include monomers with epoxy groups, monomers with methylol groups, monomers with alkoxymethyl groups and monomers with hydrolyzable silyl groups. Preferred monomers with epoxy groups include ethylenic unsaturated monomers with alkoxymethyl groups, with specific examples including glycidyl (meth)acrylate, 2,3-epoxycyclohexyl (meth)acrylate, 3,4-epoxycyclohexyl (meth) acrylate and allyl glycidyl ether.

Examples of monomers with methylol groups include N-methylolacrylamide, N-methylolmethacrylamide, dimethylolacrylamide and dimethylolmethacrylamide. A monomer with an alkoxymethyl group is preferably an ethylenic unsaturated monomer with an alkoxymethyl group, with specific examples including N-methoxymethyl acrylamide, N-methoxymethyl methacrylamide, N-butoxymethyl acrylamide and N-butoxymethyl methacrylamide. Examples of monomers with hydrolyzable silyl groups include vinylsilane, γ-acryloxypropyltrimethoxysilane, γ-acryloxypropyltriethoxysilane, γ-methacryloxypropyltrimethoxysilane and γ-methacryloxypropyltriethoxysilane. They may be used alone or optionally as combinations of two or more types.

These acrylic polymers may also have other monomers as monomer units for improved quality or physical properties.

Examples of such monomers include monomers with carboxyl groups (excluding (meth)acrylic acid), monomers with amide groups, monomers with cyano groups, monomers with hydroxyl groups, and aromatic vinyl monomers (excluding divinylbenzene). Vinyl-based monomers with functional groups such as sulfonic acid and phosphoric acid groups, or vinyl acetate, vinyl propionate, vinyl versatate, vinylpyrrolidone, methylvinyl ketone, butadiene, ethylene, propylene, vinyl chloride and vinylidene chloride, may also be used as necessary. They may be used alone or optionally as combinations of two or more types. Such other monomers may also simultaneously belong to two or more of the aforementioned monomer categories.

(Meth)acrylamide is an example of a monomer with an amide group. Monomers with cyano groups are preferably ethylenic unsaturated monomers with cyano groups, a specific example being (meth)acrylonitrile. An example of a monomer with a hydroxyl group is 2-hydroxyethyl (meth) acrylate.

Examples of aromatic vinyl monomers include styrene, vinyltoluene, divinylbenzene and a-methylstyrene, with styrene being preferred.

The proportion of (meth)acrylic compounds as monomer units, i.e. polymerizing units, in the acrylic polymer is preferably 5 weight % to 95 weight % with respect to 100 weight % of the acrylic polymer. The lower limit is more preferably 15 weight %, even more preferably 20 weight % and most preferably 30 weight %. The content ratio of the monomer unit is preferably 5 weight % or greater from the viewpoint of bonding with the substrate, and oxidation resistance. The upper limit is more preferably 92 weight %, even more preferably 80 weight % and most preferably 60 weight %. The content ratio of the monomer is preferably 95 weight % or lower in order to improve adhesion with the substrate.

When the acrylic polymer has a linear alkyl (meth) acrylate or cycloalkyl (meth)acrylate as a monomer unit, the total content ratio is preferably 3 weight % to 92 weight %, more preferably 10 weight % to 90 weight %, even more preferably 15 weight % to 75 weight % and most preferably weight % to 55 weight %, with respect to 100 weight % of the acrylic polymer. The content ratio of the monomer is preferably 3 weight % or greater from the viewpoint of improving the oxidation resistance, and it is preferably 92 weight % or lower in order to increase bonding with the substrate.

When the acrylic polymer has (meth)acrylic acid as a monomer unit, the content ratio is preferably 0.1 weight % to 5 weight % with respect to 100 weight % of the acrylic polymer. If the content ratio of the monomer is 0.1 weight % or greater the separator will tend to have an improved cushioning property when in the swelled state, and if it is 5 weight % or lower the polymerization stability will tend to be satisfactory.

When the acrylic polymer has a crosslinkable monomer as a monomer unit, the total content ratio of the crosslinkable monomer in the acrylic polymer is preferably 0.01 weight % to 10 weight %, more preferably 0.1 weight % to 5 weight % and even more preferably 0.1 weight % to 3 weight %, with respect to 100 weight % of the acrylic polymer. If the content ratio of the monomer is 0.01 weight % or greater the electrolyte solution resistance will be even further increased, and if it is 10 weight % or lower, reduction in the cushioning property in the swelled state can be further inhibited.

The acrylic polymer is preferably one of the following. The copolymerization content ratios given below are all values based on 100 weight % of the copolymer.

(1) A copolymer having a (meth)acrylic acid ester as a monomer unit (excluding the copolymers of (2) and the copolymers of (3) below). Preferred are copolymers of weight % (more preferably 0.1 weight % to 5 weight %) of (meth)acrylic acid, 3 weight % to 92 weight % (more preferably 10 weight % to 90 weight %, even more preferably 15 weight % to 75 weight % and most preferably 25 weight % to 55 weight %) of a (meth)acrylic acid ester monomer, 15 weight % or lower (more preferably 10 weight % or lower) of at least one monomer selected from the group consisting of monomers with amide groups, monomers with cyano groups and monomers with hydroxyl groups, and 10 weight % or lower (more preferably 0.01 weight % to 5 weight % and even more preferably 0.1 weight % to 3 weight %) of a crosslinkable monomer;

(2) Copolymers having an aromatic vinyl monomer and a (meth)acrylic acid ester monomer as monomer units. Preferred are copolymers of 5 weight % to 95 weight % (more preferably 10 weight % to 92 weight %, even more preferably 25 weight % to 80 weight % and most preferably weight % to 60 weight %) of an aromatic vinyl monomer, 5 weight % or lower (more preferably 0.1 weight % to 5 weight %) of (meth)acrylic acid, 5 weight % to 95 weight % (more preferably 15 weight % to 85 weight %, even more preferably 20 weight % to 80 weight % and most preferably 30 weight % to 75 weight %) of a (meth)acrylic acid ester monomer, 10 weight % or lower (more preferably 5 weight % or lower) of at least one monomer selected from the group consisting of monomers with amide groups, monomers with cyano groups and monomers with hydroxyl groups, and 10 weight % or lower (more preferably 0.01 weight % to 5 weight % and even more preferably 0.1 weight % to 3 weight %) of a crosslinkable monomer.

(3) Copolymers having a monomer with a cyano group and a (meth)acrylic acid ester monomer as monomer units. Preferred are copolymers of 1 weight % to 95 weight % (more preferably 5 weight % to 90 weight %, even more preferably 50 weight % to 85 weight %) of a monomer with a cyano group, 5 weight % or lower (more preferably 0.1 weight % to 5 weight %) of (meth)acrylic acid, 1 weight % to 95 weight % (more preferably 5 weight % to 85 weight % and even more preferably 10 weight % to 50 weight %) of a (meth)acrylic acid ester monomer, 10 weight % or lower (more preferably 5 weight % or lower) of at least one monomer selected from the group consisting of monomers with amide groups, monomers with cyano groups and monomers with hydroxyl groups, and 10 weight % or lower (more preferably 0.01 weight % to 5 weight % and even more preferably 0.1 weight % to 3 weight %) of a crosslinkable monomer.

For the copolymer of (2) above, a hydrocarbon ester of (meth)acrylic acid is preferred as the (meth)acrylic acid ester monomer. The copolymerization ratio of the hydrocarbon ester of (meth)acrylic acid in this case is preferably 0.1 weight % to 5 weight %. When the copolymer of (2) above has a monomer with an amide group, the copolymerization ratio is preferably 0.1 weight % to 5 weight %. When the copolymer of (2) above has a monomer with a hydroxyl group, the copolymerization ratio is preferably 0.1 weight % to 5 weight %.

For the copolymer of (3) above, the (meth)acrylic acid ester monomer is preferably at least one monomer including at least one selected from the group consisting of linear alkyl (meth)acrylates and cycloalkyl (meth)acrylates. A linear alkyl (meth)acrylate is preferably a (meth)acrylic acid ester having a linear alkyl group of 6 or more carbon atoms. The copolymerization ratio of linear alkyl (meth)acrylates in the copolymer of (3) is preferably 1 weight % to 95 weight %, more preferably 3 weight % to 90 weight % and even more preferably 5 weight % to 85 weight %. The upper limit for the copolymerization ratio may be 60 weight %, and especially 40 weight % or 30 weight %, with 20 weight % being most preferred. The copolymerization ratio of cyclohexylalkyl (meth)acrylates in the copolymer of (3) is preferably 1 weight % to 95 weight %, more preferably 3 weight % to 90 weight % and even more preferably 5 weight % to 85 weight %. The upper limit for the copolymerization ratio may be 60 weight %, and especially 50 weight %, with 40 weight % being most preferred. When the copolymer of (3) above has a monomer with an amide group, the copolymerization ratio is preferably 0.1 weight % to 10 weight % and more preferably 2 weight % to 10 weight %. When the copolymer of (3) above has a monomer with a hydroxyl group, the copolymerization ratio is preferably 0.1 weight % to 10 weight % and more preferably 1 weight % to 10 weight %.

For example, an acrylic polymer can be obtained by polymerizing a monomer composition containing each of the monomers in a dispersed system containing the monomers, a surfactant, a radical polymerization initiator and other additive components as necessary, as the basic components, in an aqueous medium. Various methods may be utilized as necessary for the polymerization, such as a method in which the makeup of the supplied monomer composition is kept constant during the entire polymerization process, or a method of causing morphological variation in the composition of particles of a resin dispersion produced by successive or continuous variation during the polymerization process. When the acrylic polymer is obtained by emulsion polymerization, it may be in the form of an aqueous dispersion (latex) comprising water and a particulate acrylic polymer dispersed in the water, for example.

A surfactant is a compound having at least one hydrophilic group and at least one lipophilic group in the molecule. The surfactant will be described below and will not be discussed here.

As radical polymerization initiators there may be used any that undergo radical decomposition by heat or reducing substances to initiate addition polymerization of monomers. The radical polymerization initiator will be described below and will not be discussed here.

Among these forms of thermoplastic polymers, acrylic copolymer latexes formed from an emulsion containing a monomer, an emulsifying agent, an initiator and water are preferred from the viewpoint of achieving adhesion between the separator and electrodes, a high-temperature storage characteristic for the electrical storage device, an improved cycle characteristic and a thinner bonded combination of the electrodes and separator.

The glass transition temperature (Tg) of the particulate polymer is preferably −50° C. or higher, more preferably −30° C. or higher and even more preferably 20° C. or higher from the viewpoint of adhesion with electrodes and ion permeability, while from the viewpoint of inhibiting blocking it is yet more preferably 40° C. or higher. It is preferably 25° C. or higher from the viewpoint of maintaining a particulate state at ordinary temperature. The glass transition temperature of the particulate polymer is also preferably 200° C. or lower. The glass transition temperature is the midpoint glass transition temperature according to JISK7121, determined from a DSC curve obtained by differential scanning calorimetry (DSC). Specifically, the value used for the glass transition temperature may be the temperature at the intersection between a straight line drawn equidistant in the vertical axis direction between a straight line extending the low-temperature end baseline in the DSC curve toward the high-temperature end, and the curve at the portion of glass transition that changes in a stepwise manner with respect to a straight line equidistant in the vertical axis direction from a straight line extending the high-temperature end baseline in the DSC curve toward the low-temperature end. More specifically, it may be determined by the method described in the Examples. Moreover, the "glass transition" refers to the value when a change in heat flow rate accompanying the change in state of a polymer test piece in DSC occurs at the endothermic end. The change in heat flow rate is observed in the form of a stepwise change in the DSC curve. A "stepwise change" is a portion of the DSC curve moving away from the previous low-temperature end baseline and toward a new high-temperature end baseline. A combination of a stepwise change and a peak is also included in the concept of "stepwise change". If the exothermic end in the stepwise change region is defined as the top end, then this represents the point where the upwardly convex curve changes to a downwardly convex curve. The term "peak" refers to a portion of the DSC curve that moves away from the low-temperature end baseline and then returns to the same baseline. The term "baseline" refers to the DSC curve in the temperature zone where no transition or reaction takes place in the test piece.

The glass transition temperature Tg of a particulate polymer can be appropriately adjusted by changing the type of monomer used for production of the particulate polymer, and the mixing ratio of each monomer, when the particulate polymer is a copolymer. Specifically, the glass transition temperature for each monomer used for production of the particulate polymer can be estimated from the commonly used Tg for its homopolymer (as listed in "Polymer Handbook (a Wiley-Interscience Publication), for example), and the mixing proportion of the monomer. For example, the Tg of a copolymer copolymerized with a high proportion of a monomer such as methyl methacrylate, acrylonitrile or methacrylic acid, that have homopolymer Tg values of ~100° C., will be higher, and the Tg of a copolymer copolymerized with a high proportion of a monomer such as n-butyl acrylate or 2-ethylhexyl acrylate, that have homopolymer Tg values of ~−50° C., will be lower.

The Tg of the copolymer can also be estimated by the Fox formula represented by the following mathematical formula (1).

$$1/Tg = W_1/Tg_1 + W_2/Tg_2 + \ldots + Wi/Tgi + \ldots Wn/Tgn \quad (1)$$

In this formula, Tg(K) is the Tg of the copolymer, Tgi(K) is the Tg of the homopolymer of monomer i, and Wi is the mass fraction of each monomer.

However, the glass transition temperature Tg of the particulate polymer used for a preferred embodiment is the value measured by a method using DSC as described above.

From the viewpoint of wettability for the substrate, the bonding property between the substrate and thermoplastic polymer-containing layer, and adhesion for the electrodes, the thermoplastic polymer-containing layer preferably includes a polymer with a glass transition temperature of lower than 20° C. The glass transition temperature of a polymer having a glass transition temperature of lower than 20° C. is preferably −100° C. or higher, more preferably −50° C. or higher and even more preferably −40° C. or higher from the viewpoint of ion permeability, while it is preferably lower than 20° C., more preferably lower than 15° C. and even more preferably lower than 10° C. from the viewpoint of the bonding property between the polyolefin microporous membrane and the thermoplastic polymer-containing layer.

From the viewpoint of improving the handling property during production, the particulate polymer preferably has at least two glass transition temperatures. That is, the thermoplastic polymer-containing layer preferably includes two or more thermoplastic polymers with different glass transition temperatures. The method for producing a particulate polymer with at least two glass transition temperatures is not particularly restricted, and it may be a method of blending two or more particulate polymers or a method of using a particulate polymer with a core-shell structure. A core-shell structure is a polymer having a structure with a center portion and an outer shell portion covering the center portion, as a double structure with different types and compositions of the polymers composing each portion. For a polymer blend or core-shell structure, the glass transition temperature of the particulate polymer as a whole can be controlled by combination of a polymer with a high glass transition temperature and a polymer with a low glass transition temperature. Multiple functions may also be imparted to the particulate polymer as a whole.

When two or more particulate polymers are to be blended, for example, one or more polymers having a glass transition temperature in the range of 20° C. or higher may be blended with one or more polymers having a glass transition temperature in the range of lower than 20° C., to obtain more satisfactory sticking resistance and wettability onto substrates. In the case of a blend, the mixing ratio of each polymer is such that the ratio of the polymer having a glass transition temperature in the range of 20° C. or higher and the polymer having a glass transition temperature in the range of lower than 20° C. is preferably in the range of 0.1:99.9 to 99.9:0.1, more preferably 5:95 to 95:5, even more preferably 50:50 to 95:5 and most preferably 60:40 to 90:10.

By selecting the type of polymer for the outer shell portion when using a particulate polymer comprising a core-shell structure, it is possible to adjust the adhesion and compatibility of the thermoplastic polymer-containing layer for other members (such as the substrate). By selecting the type of polymer for the center portion it is possible to increase the adhesion for electrodes after hot pressing, for example. Alternatively, the viscoelasticity of the thermoplastic polymer-containing layer can be controlled by combining a polymer having high viscosity with a polymer having high elasticity.

The glass transition temperature of the outer shell portion (shell) of a thermoplastic polymer comprising a core-shell structure is not particularly restricted, but it is preferably 20° C. or higher and more preferably 80° C. or higher, and preferably 200° C. or lower and more preferably 130° C. or lower. The glass transition temperature of the center portion (core) of a thermoplastic polymer comprising a core-shell structure is also not particularly restricted, but it is preferably 20° C. or higher, more preferably 20° C. to 200° C. and even more preferably 40° C. to 200° C.

The arithmetic mean particle size of the particulate polymer is preferably 50 nm or greater, more preferably 150 nm or greater and even more preferably 200 nm or greater. The arithmetic mean particle size of the particulate polymer is also 10,000 nm or smaller, preferably 1200 nm or smaller, more preferably 1000 nm or smaller and even more preferably 700 nm or smaller. If the arithmetic mean particle size is 10 nm or greater it will be possible to maintain higher ion permeability for the separator. Accordingly, this range is preferred from the standpoint of enhancing the adhesion between the electrodes and separator and the cycle characteristic and rate property of the electrical storage device. An arithmetic mean particle size of 10,000 nm or smaller is preferred from the viewpoint of ensuring dispersion stability when the thermoplastic polymer-containing layer including a particulate polymer is formed from an aqueous dispersion, while it is also preferred from the viewpoint of allowing the thickness of the thermoplastic polymer-containing layer to be flexibly controlled and preventing desorption of the thermoplastic polymer from the separator after drying.

From the same viewpoint, the arithmetic mean particle size of the particulate polymer is most preferably 50 nm to 10,000 nm. Within this range, contrast between the substrate or inorganic filler layer and the pattern of the thermoplastic polymer layer will be satisfactory during inspection of the separator surface by the inspection method described above, making it possible to carry out more reliable inspection.

The arithmetic mean particle size of the particulate polymer is measured by the method described in the Examples.

The thermoplastic polymer-containing layer may also contain two or more particulate polymers with different arithmetic mean particle sizes. For example, it is preferred to use a combination of a particulate polymer having an arithmetic mean particle size of 10 nm to 400 nm (hereunder referred to as "small-diameter particles") and a particulate polymer having an arithmetic mean particle size of greater than 100 nm and up to 2000 nm (hereunder referred to as "large-diameter particles").

The surfactant used for polymerization of the particulate polymer is a compound having at least one hydrophilic group and at least one lipophilic group in the molecule. Examples of surfactants include polyether surfactants; anionic surfactants such as non-reactive alkylsulfuric acid esters, polyoxyethylenealkyl ether sulfuric acid ester salts, alkylbenzenesulfonic acid salts, alkylnaphthalenesulfonic acid salts, alkylsulfosuccinic acid salts, alkyldiphenylether disulfonic acid salts, formalin naphthalenesulfonate condensate, polyoxyethylene polycyclic phenylether sulfuric acid ester salts, polyoxyethylene distyrenated phenyl ether sulfuric acid ester salts, fatty acid salts, alkylphosphoric acid salts and polyoxyethylene alkylphenyl ether sulfuric acid ester salts; and nonionic surfactants such as non-reactive polyoxyethylene alkyl ethers, polyoxyalkylene alkyl ethers, polyoxyethylene polycyclic phenyl ethers, polyoxyethylene distyrenated phenyl ethers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylenealkylamines, alkylalkanolamides and polyoxyethylenealkylphenyl ethers. In addition to these, there may be used reactive surfactants comprising an ethylenic double bond introduced into the chemical structural formula of a surfactant having a hydrophilic group and a lipophilic group.

Examples of anionic surfactants among reactive surfactants include ethylenic unsaturated monomers having sulfonic acid, sulfonates or sulfuric acid esters or their salts, among which compounds with groups that are ammonium salts or alkali metal salts of sulfonic acid (ammonium sulfonate or alkali metal sulfonate groups) are preferred. Specific examples include alkylallylsulfosuccinic acid salts (such as ELEMINOL™ JS-20 by Sanyo Chemical Industries, Ltd., and LATEMUL™ S-120, S-180A and S-180 by Kao Corp.), polyoxyethylene alkylpropenylphenyl ether sulfuric acid ester salts (such as AQUALON™ HS-10 by Dai-ichi Kogyo Seiyaku Co., Ltd.), α-[1-[(allyloxy)methyl]-2-(nonylphenoxy)ethyl]-ω-polyoxyethylenesulfuric    acid ester salts (such as ADEKA REASOAP™ SE-10N by Adeka Corp.), ammonium-α-sulfonato-ω-1-(allyloxymethyl)alkyloxypolyoxyethylenes (such as AQUALON KH-10 by Dai-ichi Kogyo Seiyaku Co., Ltd.), styrenesulfonic acid salts (such as SPINOMAR™ NaSS by Tosoh Finechem Corp.), α-[2-[(allyloxy)-1-(alkyloxymethyl)ethyl]-ω-polyoxyethylenesulfuric acid ester salts (such as ADEKA REASOAP SR-10 by Adeka Corp.), and polyoxyethylenepolyoxybutylene(3-methyl-3-butenyl)ether sulfuric acid ester salts (such as LATEMUL PD-104 by Kao Corp.).

Examples of nonionic surfactants among reactive surfactants include α-[1-[(allyloxy)methyl]-2-(nonylphenoxy)ethyl]-ω-hydroxypolyoxyethylene (such as ADEKA REASOAP NE-20, NE-30 and NE-40 by Adeka Corp.), polyoxyethylene alkylpropenylphenyl ethers (such as AQUALON RN-10, RN-20, RN-30 and RN-50 by Dai-ichi Kogyo Seiyaku Co., Ltd.), α-[2-[(allyloxy)-1-(alkyloxymethyl)ethyl]-ω-hydroxypolyoxyethylenes (such as ADEKA REASOAP ER-10 by Adeka Corp.) and polyoxyethylenepolyoxybutylene(3-methyl-3-butenyl) ethers (such as LATEMUL PD-420 by Kao Corp.). These surfactants are preferably used at 0.1 parts by weight to 5 parts by weight with respect to 100 parts by weight of the monomer composition. One type of surfactant may be used alone, or two or more may be used in combination.

A radical polymerization initiator used for polymerization of the particulate polymer may be any inorganic initiator or organic initiator that undergoes radical decomposition by heat or reducing substances to initiate addition polymerization of monomers. Either water-soluble or oil-soluble polymerization initiators may be used as radical polymerization initiators. Examples of water-soluble polymerization initiators include peroxodisulfuric acid salts, peroxides, water-soluble azobis compounds, and peroxide-reducing agent redox-type initiators. Examples of peroxodisulfuric acid salts include potassium peroxodisulfate (KPS), sodium peroxodisulfate (NPS) and ammonium peroxodisulfate (APS), examples of peroxides include hydrogen peroxide, t-butyl hydroperoxide, t-butylperoxymaleic acid and succinic acid peroxide and benzoyl peroxide, examples of water-soluble azobis compounds include 2,2-azobis(N-hydroxyethylisobutylamide), 2,2-azobis(2-amidinopropane) 2HCl and 4,4-azobis(4-cyanopentanoic acid), and examples of peroxide-reducing agent redox-type initiators include combinations of the aforementioned peroxides with one or more reducing agents such as sodium sulfooxylate formaldehyde, sodium hydrogensulfite, sodium thiosulfate, sodium hydroxymethanesulfinate or L-ascorbic acid, or their salts, cuprous salts or ferrous salts.

The radical polymerization initiator may be used at, preferably, 0.05 parts by weight to 2 parts by weight with respect to 100 parts by weight of the monomer composition. A single type of radical polymerization initiator may be used, or two or more may be used in combination.

When the monomer composition comprising the ethylenic unsaturated monomer having a polyalkylene glycol group (P), the ethylenic unsaturated monomer with a cycloalkyl group (A) and the other monomer (B) is to be used for emulsion polymerization and a dispersion is to be formed by dispersing the polymer particles in a solvent (water), the solid content of the dispersion is preferably 30 weight % to 70 weight %. The dispersion is preferably adjusted to a pH in the range of 5 to 12 in order to maintain long-term dispersion stability. The pH is preferably adjusted using ammonia, sodium hydroxide, potassium hydroxide or an amine compound such as dimethylaminoethanol, and more preferably the pH is adjusted with ammonia (water) or sodium hydroxide.

The aqueous dispersion comprises particles of a copolymer, obtained by polymerization of a monomer composition including the specific monomers mentioned above (polymer particles), and dispersed in water. In addition to water and the polymer, the aqueous dispersion may also include a solvent such as methanol, ethanol or isopropyl alcohol, and a dispersing agent, lubricant, thickener, microbicide or the like. In order to allow the thermoplastic polymer-containing layer to be easily formed by coating, preferably the particulate polymer is formed by emulsion polymerization and the obtained particulate polymer emulsion is used as an aqueous latex.

[Optional Layers]

The scope of the invention also includes a mode in which an optional layer such as an inorganic filler layer (inorganic filler porous layer) is included between the substrate and thermoplastic polymer-containing layer. An inorganic filler porous layer includes an inorganic filler and has multiple pores.

The inorganic filler porous layer will now be described assuming a mode in which the thermoplastic polymer layer is present on part of at least the inorganic filler layer, or in other words, a mode including an inorganic filler porous layer between the substrate and the thermoplastic polymer-containing layer, although optional layers such as the inorganic filler porous layer may be omitted for the purpose of the invention.

(Inorganic filler)

The inorganic filler is not particularly restricted, but preferably it has a melting point of 200° C. or higher and also high electrical insulating properties, and is also electrochemically stable in the range in which an electrical storage device such as a lithium ion secondary battery is to be used.

Inorganic fillers are not particularly restricted, and examples include inorganic oxides (oxide-based ceramics) such as alumina, silica, titania, zirconia, magnesia, ceria, yttria, zinc oxide and iron oxide; inorganic nitrides (nitride-based ceramics) such as silicon nitride, titanium nitride and boron nitride; ceramics such as silicon carbide, calcium carbonate, magnesium sulfate, aluminum sulfate, barium sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. They may also be used alone or as combinations of two or more types.

The volume-average particle size (D50) of the inorganic filler may be 50 nm or greater, preferably 250 nm or greater and even more preferably 500 nm or greater, for example. The mean particle size may also be 2,000 nm or smaller, preferably 950 nm or smaller and even more preferably smaller than 600 nm.

An inorganic filler mean particle size of 50 nm or greater will ensure satisfactory permeability. An inorganic filler mean particle size of 2,000 nm or smaller, on the other hand, will ensure satisfactory heat resistance. With a mean particle size within this range, contrast between the inorganic filler layer and the pattern of the thermoplastic polymer layer will be satisfactory during inspection of the separator surface by the inspection method described above, making it possible to carry out more reliable inspection.

The method of adjusting the particle diameters of the inorganic filler and their distribution may be, for example, a method of pulverizing the inorganic filler using a suitable pulverizing apparatus such as a ball mill, bead mill or jet mill to reduce their particle diameters.

The particle size distribution of the inorganic filler may have a single peak in a graph of frequency plotted against particle diameter. However, the graph may also have two peaks, or a trapezoid chart without peaks.

Examples for the form of the inorganic filler include laminar, scaly, needle-like, columnar, spherical, polyhedral and globular (block-like). Different types of inorganic fillers with such shapes may also be combined.

The content ratio of the inorganic filler in the inorganic filler porous layer may be 20 weight % or greater and less than 100 weight %, 30 weight % to 80 weight %, 35 weight % to 70 weight % or even 40 weight % to 60 weight %, with respect to the total amount of the inorganic filler porous layer.

If the volume-average particle size of the thermoplastic polymer is represented as D1 and the volume-average particle size of the inorganic filler is represented as D2, D1 and D2 preferably satisfy the formula:

$$D1/D2 \leq 0.8 \text{ or } D1/D2 \geq 1.2. \ D1 \text{ and } D2 \text{ more preferably satisfy the formula:}$$

$$0.025 \leq D1/D2 \leq 0.8 \text{ or } 200 \geq D1/D2 \geq 1.2,$$

even more preferably satisfy the formula:

$$D1/D2 \leq 0.5 \text{ or } D1/D2 \geq 2.0,$$

and most preferably satisfy the formula:

$$D1/D2 \leq 0.3 \text{ or } D1/D2 \geq 3.0.$$

If the ratio D1/D2 of the volume-average particle sizes of the thermoplastic polymer and inorganic filler is within this range, contrast between the inorganic filler layer and the pattern of the thermoplastic polymer layer will be satisfactory during inspection of the separator surface by the inspection method described above, making it possible to carry out more reliable inspection.

(Resin Binder)

The type of resin of the resin binder in the inorganic filler porous layer is not particularly restricted, and it may be a resin that is insoluble in the electrolyte solution of an electrical storage device such as a lithium ion secondary battery and electrochemically stable in the operating range of an electrical storage device such as a lithium ion secondary battery. The resin of the resin binder may also employ a bonding binder (C) which bonds the particulate polymer (B) to the substrate or inorganic filler porous layer and is included in the thermoplastic polymer-containing layer, in addition to the resin binder (A) in the inorganic filler porous layer and the particulate polymer (B) in the thermoplastic polymer-containing layer. The resin binder (A) and bonding binder (C) will usually not be in particulate form in the separator. The particulate polymer (B), however, is in particulate form in the separator, the particulate polymer (B) optionally including a resin of a different type from the resin binder (A) and bonding binder (C).

Specific examples of such resins include resins with melting points and/or glass transition temperatures of 180° C. or higher, among which are polyolefins such as polyethylene and polypropylene; fluorinated resins such as polyvinylidene fluoride and polytetrafluoroethylene; fluorinated rubbers such as vinylidene fluoride-hexafluoropropylene-tetrafluoroethylene copolymer and ethylene-tetrafluoroethylene copolymer; rubbers such as styrene-butadiene copolymer and its hydrogenated forms, acrylonitrile-butadiene copolymer and its hydrogenated forms, acrylonitrile-butadiene-styrene copolymer and its hydrogenated forms, methacrylic acid ester-acrylic acid ester copolymer, styrene-acrylic acid ester copolymer, acrylonitrile-acrylic acid ester copolymer, ethylene-propylene rubber, polyvinyl alcohol and polyvinyl acetate; cellulose derivatives such as ethyl cellulose, methyl cellulose, hydroxyethyl cellulose and carboxymethyl cellulose; and polyphenylene ether, polysulfone, polyethersulfone, polyphenylene sulfide, polyetherimide, polyamideimide, polyamide, polyester and the like. They may be used alone or optionally as combinations of two or more types.

The resin binder may include a resin latex binder, for example. Examples of resin latex binders include copolymers of unsaturated carboxylic acid monomers, and other monomers that are copolymerizable with them. Examples of aliphatic conjugated diene-based monomers include butadiene and isoprene, with unsaturated carboxylic acid monomers including (meth)acrylic acid, and other monomers including styrene. The polymerization method for such a copolymer is not particularly restricted but is preferably emulsion polymerization. There are no particular restrictions on the method of emulsion polymerization, and any known method may be employed. The method of adding the monomers and other components is also not particularly restricted and may be a batch addition method, multistage addition method or continuous addition method, and the polymerization method used may be single-stage polymerization, or multistage polymerization such as two-stage polymerization or three-stage polymerization, or with more stages.

Specific examples of resin binders include the following 1) to 7).

1) Polyolefins: Polyethylene, polypropylene, ethylene-propylene rubber and modified forms of these;
  2) Conjugated diene-based polymers: For example, styrene-butadiene copolymers and their hydrogenated forms, acrylonitrile-butadiene copolymers and their hydrogenated forms and acrylonitrile-butadiene-styrene copolymers and their hydrogenated forms;
  3) Acrylic-based polymers: For example, methacrylic acid ester-acrylic acid ester copolymers, styrene-acrylic acid ester copolymers and acrylonitrile-acrylic acid ester copolymers;
  4) Polyvinyl alcohol-based resins: For example, polyvinyl alcohol and polyvinyl acetate;
  5) Fluorine-containing resins: For example, polyvinylidene fluoride, polytetrafluoroethylene, vinylidene fluoride-hexafluoropropylene-tetrafluoroethylene copolymer and ethylene-tetrafluoroethylene copolymer;
  6) Cellulose derivatives: For example, ethyl cellulose, methyl cellulose, hydroxyethyl cellulose and carboxymethyl cellulose; and
  7) Polymers that are resins with a melting point and/or glass transition temperature of 180° C. or higher, or without a melting point but having a decomposition temperature of 200° C. or higher: For example, polyphenylene ethers, polysulfones, polyethersulfones, polyphenylene sulfides, polyetherimides, polyamideimides, polyamides and polyesters.

When the resin binder is a resin latex binder, the mean particle size (D50) is 50 to 500 nm, 60 to 460 nm or 80 to 250 nm, for example. The mean particle size of the resin binder can be controlled, for example, by adjusting the polymerization time, the polymerization temperature, the compositional ratio of the components, the loading order of the components, and the pH.

The content ratio of the resin binder in the inorganic filler layer may be 0.5 parts by weight to 20 parts by weight, 1 parts by weight to 15 parts by weight, 2 parts by weight to 10 parts by weight or even 3 parts by weight to 5 parts by weight, for example, with respect to 100 parts by weight of the inorganic filler.

A satisfactory bonding property can be ensured if the proportion of the resin binder in the inorganic filler layer is 0.5 parts by weight or greater, and satisfactory permeability can be ensured if it is 20 parts by weight or lower. If the proportion of the resin binder in the inorganic filler layer is within this range, contrast between the inorganic filler layer and the pattern of the thermoplastic polymer layer will be satisfactory during inspection of the separator surface by the inspection method described above, making it possible to carry out more reliable inspection.

The content of the particulate polymer in the inorganic filler porous layer may be less than 5 vol %, less than 3 vol % or even less than 2 vol % of the content of the particulate polymer in the separator.

The thickness of the inorganic filler porous layer may be 10.0 μm or smaller or even 6.0 μm or smaller, for example. The thickness of the inorganic filler porous layer may also be 0.5 μm or greater, for example. The layer density of the inorganic filler porous layer may be 0.5 g/(m$^2$ μm) to 3.0 g/(m$^2$ μm), or even 0.7 to 2.0 cm$^3$, for example.

(Optional Components)

The thermoplastic polymer-containing layer may comprise the thermoplastic polymer alone, or it may also comprise other optional components in addition to the thermoplastic polymer. Examples of optional components include the inorganic filler described above for formation of the inorganic filler porous layer. The content of the thermoplastic polymer in the thermoplastic polymer-containing layer is preferably 60 weight % or greater, more preferably 90 weight % or greater, even more preferably 95 weight % or greater and most preferably 98 weight % or greater, with respect to the total amount of the thermoplastic polymer-containing layer.

(Separator Properties)

The air permeability of the separator is preferably 40 seconds/100 cm$^3$ to 500 seconds/100 cm$^3$, more preferably 70 seconds/100 cm$^3$ to 300 seconds/100 cm$^3$, and even more preferably 100 seconds/100 cm$^3$ to 200 seconds/100 cm$^3$. This will allow higher ion permeability to be exhibited when the separator is employed in an electrical storage device. The air permeability is the air permeability resistance measured according to JIS P-8117, similar to the air permeability of the polyolefin porous base material.

Self-discharge can be prevented if the air permeability of the separator is 40 seconds/100 cm$^3$ or greater. Satisfactory permeability can be ensured if it is 500 seconds/100 cm$^3$ or lower. If the air permeability of the separator is within this range, then air permeability will not be excessive and adsorption onto the stage will be possible when the separator is adsorbed onto the stage of the inspection device during inspection of the separator surface by the inspection method described above, thus allowing more reliable inspection to be carried out.

Variation in the thickness of the separator is preferably within ±10 μm, more preferably within ±5 μm and even more preferably within ±2 μm of the layer thickness. This can inhibit variation in the permeability and strength of the substrate. If variation in the thickness of the separator is within this range it will be possible to inhibit focus deviation and to ensure image sharpness during inspection of the separator surface by the inspection method described above, allowing more reliable inspection to be carried out.

<Specific Method for Producing Separator>

[Method for Producing Substrate]

The method for producing the substrate is not particularly restricted and may be any known production method, examples including wet pore-forming methods and dry pore-forming methods. When the substrate is a polyolefin microporous membrane, examples of wet pore-forming methods include a method of melt kneading a polyolefin resin composition and a plasticizer and molding the mixture into a sheet, optionally with stretching, and then extracting the plasticizer to form pores; a method of melt kneading a polyolefin resin composition that includes a polyolefin-based resin as the major component, extruding it at a high draw ratio, and then stretching it with heat treatment to detach the polyolefin crystal interface and form pores; a method of melt kneading a polyolefin resin composition and an inorganic filler and casting the mixture into a sheet, and then detaching the interface between the polyolefin and the inorganic filler by stretching to form pores; and a method of first dissolving the polyolefin resin composition, and then dipping it in a poor solvent for the polyolefin to solidify the polyolefin while simultaneously removing the solvent, to form pores.

The method of fabricating a nonwoven fabric or paper sheet as the substrate may also be a known method. The fabrication method may be, for example, a chemical bond method in which a web is immersed in a binder and dried to produce bonding between the fibers; a thermal bond method in which heat-fusible fibers are mixed into a web and the fibers are partially melted to produce bonding between the fibers; a needle punching method in which a web is repeatedly pierced with a puncturing needle to mechanically tangle the fibers; or a hydroentangling method in which a high-pressure water stream is sprayed from a nozzle onto a web through a net (screen), producing tangling between the fibers.

An example of a method of producing the polyolefin microporous membrane will now be described, as a method of melt kneading a polyolefin resin composition and a plasticizer, casting the mixture into a sheet, and then extracting the plasticizer. First, the polyolefin resin composition and the plasticizer are melt kneaded. In the melt kneading method, a polyolefin resin and other additives as necessary may be loaded into a resin kneader such as an extruder, kneader, Laboplastomil, kneading roll or Banbury mixer, and the plasticizer introduced at a desired proportion and kneaded in while hot melting the resin components. Before loading the polyolefin resin, the other additives and the plasticizer into the resin kneader, they are preferably pre-kneaded in a prescribed proportion using a Henschel mixer or the like. More preferably, only a portion of the plasticizer is loaded in during the pre-kneading, while the remainder of the plasticizer is kneaded in while side feeding it to the resin kneader.

The plasticizer used may be a non-volatile solvent that can form a homogeneous solution at or above the melting point of the polyolefin. Specific examples of such non-volatile solvents include hydrocarbons such as liquid paraffin and paraffin wax; esters such as dioctyl phthalate and dibutyl phthalate; and higher alcohols such as oleyl alcohol and stearyl alcohol, with liquid paraffin being preferable among these. Liquid paraffin is preferred among these.

The proportion of the polyolefin resin composition and the plasticizer is not particularly restricted so long as it is in a range in which they can undergo uniform melt kneading to then be cast into a sheet form. For example, the weight fraction of the plasticizer in the composition comprising the polyolefin resin composition and the plasticizer is preferably 30 weight % to 80 weight % and more preferably 40 weight % to 70 weight %. The weight fraction of the plasticizer is preferably within this range from the viewpoint of both melt tension during melt molding, and formation of a homogeneous and fine pore structure.

The melt kneaded mixture obtained by hot melting and kneading in this manner is then cast into a sheet. The method of producing the cast sheet may be, for example, a method of extruding the melt kneaded mixture through a T-die or the like into a sheet, and contacting it with a heat conductor to cool it to a sufficiently lower temperature than the crystallization temperature of the resin component, thereby solidifying it. The heat conductor used for the cooling solidification may be metal, water, air or the plasticizer itself, but a metal roll is preferred because it has high heat conduction efficiency. When the melt kneaded mixture is to be contacted with metal rolls, the melt kneaded mixture is more preferably sandwiched between the rolls because this will further increase the heat conduction efficiency while causing the sheet to become oriented and increasing the film strength, while the surface smoothness of the sheet will also be improved. The die lip gap when extruding into a sheet from a T-die is preferably from 400 μm to 3000 μm and more preferably from 500 μm to 2500 μm.

The cast sheet obtained in this manner is then preferably stretched. Both uniaxial stretching and biaxial stretching are suitable for the stretching treatment. Biaxial stretching is preferred from the viewpoint of the strength of the obtained microporous membrane. When a cast sheet is subjected to high-ratio stretching in the biaxial directions, the molecules become oriented in the in-plane direction, such that the porous base material that is obtained as the final result is less likely to tear, and has high puncture strength. Examples of stretching methods include simultaneous biaxial stretching, sequential biaxial stretching, multistage stretching and repeated stretching. Simultaneous biaxial stretching is preferred from the viewpoint of increasing the puncture strength and obtaining greater uniformity during stretching and superior shutdown properties.

The stretch ratio is an area increase by a factor of preferably in the range of 20 to 100, and more preferably in the range of 25 to 50. The stretch ratio in each axial direction is preferably in the range of 4 to 10 in the MD direction and 4 to 10, inclusive, in the TD direction, and more preferably in the range of 5 to 8 in the MD direction and 5 and 8 in the TD direction. The stretch ratio is preferably within this range, because it will be possible to impart more sufficient strength while preventing film breakage in the stretching step and obtaining high productivity.

The cast sheet obtained as described above may also be subjected to rolling. Rolling may be carried out, for example, by a press method using a double belt press machine or the like. Rolling can increase the orientation of the surface layer part of the cast sheet. The area increase by rolling is preferably by a factor of greater than 1 and no greater than 3, and more preferably a factor of greater than 1 and no greater than 2. The area increase by rolling is preferably within this range from the viewpoint of increasing the film strength of the porous base material that is obtained at the final stage, and allowing formation of a porous structure that is uniform in the thickness direction of the film.

The plasticizer is then removed from the cast sheet to obtain a porous substrate. The method of removing the plasticizer may be, for example, a method of immersing the cast sheet in an extraction solvent to extract the plasticizer, and then thoroughly drying it. The method of extracting the plasticizer may be either a batch process or a continuous process. In order to minimize contraction of the porous substrate, it is preferred to constrain the edges of the cast sheet during the series of steps of immersion and drying. The plasticizer residue in the porous substrate is preferably less than 1 weight %.

The extraction solvent used is preferably one that is a poor solvent for the polyolefin resin and a good solvent for the plasticizer, and that has a boiling point that is lower than the melting point of the polyolefin resin. Examples of such extraction solvents include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

In order to minimize contraction of the porous substrate, heat treatment such as heat setting or thermal relaxation may also be carried out, either after the stretching step or after formation of the porous substrate. The porous substrate may also be subjected to post-treatment such as hydrophilicizing treatment with a surfactant, or crosslinking treatment with ionizing radiation.

The following is an example of dry pore-forming method different from the wet pore-forming method described above. First, a film is fabricated by melt kneading in an extruder without using a solvent followed by direct stretching orientation, after which it is subjected to an annealing step, cold drawing step and hot-rolling/stretching step to produce a microporous membrane. The dry pore-forming method used may be a method of stretching orientation of the molten resin from an extruder through a T-die, or an inflation method, with no limitation to these methods.

[Method of Disposing Thermoplastic Polymer-Containing Layer]

The thermoplastic polymer-containing layer is disposed on at least one side of the substrate produced as described above. When the inorganic filler porous layer is disposed on the surface of the substrate, the thermoplastic polymer-containing layer may be disposed over all or a portion of the surface of the inorganic filler porous layer, or the thermoplastic polymer-containing layer may be disposed on the parts of the substrate surface where the inorganic filler porous layer is not formed. The method for disposing the thermoplastic polymer-containing layer is not particularly restricted, and an example is a method of coating a coating solution comprising a particulate polymer onto the inorganic filler porous layer or substrate.

The coating solution used is preferably a dispersion of the particulate polymer in a solvent that does not dissolve the polymer. Most preferably, the particulate polymer is synthesized by emulsion polymerization, and the emulsion obtained by the emulsion polymerization may be directly used as the coating solution.

The method of coating the coating solution containing the particulate polymer onto the substrate is not particularly restricted so long as it can result in the desired coating pattern, coated film thickness and coating area. Examples include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods, spray coating methods and ink-jet coating methods. Preferred among these are gravure coater methods or spray coating methods, from the viewpoint of a high degree of freedom for the coating shape of the particulate polymer, and in order to easily obtain the preferred area ratio.

The medium of the coating solution is preferably water or a mixed solvent comprising water and a water-soluble organic medium. The water-soluble organic medium is not particularly restricted, and it may be ethanol or methanol, for example. Water is more preferred among those mentioned above. If the coating solution infiltrates to the interior of the substrate when it is coated onto the substrate, the particulate polymer including the polymer will tend to obstruct the surfaces and interiors of the substrate pores, thus lowering the permeability. Using water as the solvent or dispersing medium for the coating solution will make the coating solution less likely to infiltrate to the interiors of the substrate and will make the particulate polymer including the copolymer less likely to be present on the outer surface of the substrate, and therefore water is preferred to effectively minimize reduction in permeability. Examples of solvents or dispersing media that may be used in combination with water include ethanol and methanol.

The method of removing the solvent from the coated film after coating is not particularly restricted so long as it is a method that does not adversely affect the substrate or thermoplastic polymer-containing layer. For example, it may be a method of drying the substrate at a temperature below its melting point while anchoring it, a method of reduced pressure drying at low temperature, or a method of immersing it in a poor solvent for the particulate polymer to solidify the particulate polymer as particles, while simultaneously extracting out the solvent.

[Method for Forming Inorganic Filler Porous Layer]

When the inorganic filler porous layer is to be disposed on at least one side of the substrate, the method for forming the inorganic filler porous layer is not particularly restricted, and any known method may be used. An example is a method of coating the substrate with a coating solution comprising an inorganic filler and also a resin binder if necessary. When the substrate includes a resin, such as in a polyolefin microporous membrane, the starting materials including the inorganic filler and resin binder may be layered and extruded with the starting materials of the resin-containing substrate by a co-extrusion method, or the substrate and inorganic filler porous layer (membrane) may be produced separately and then attached.

The solvent for the coating solution is preferably one that can uniformly and stably disperse or dissolve the inorganic filler and if necessary the resin binder, and examples include N-methylpyrrolidone, N,N-dimethylformamide, N,N-dimethyl acetamide, water, ethanol, toluene, hot xylene, methylene chloride and hexane.

The coating solution may also contain various additives including dispersing agents such as surfactants; thickeners; moistening agents; antifoaming agents; and pH adjusters that contain acids or alkalis.

The method of dispersing or dissolving the inorganic filler and if necessary the resin binder in the medium of the coating solution may be, for example, a mechanical stirring method using a ball mill, bead mill, planetary ball mill, vibrating ball mill, sand mill, colloid mill, attritor, roll mill, high-speed impeller disperser, disperser, homogenizer, high-speed impact mill, ultrasonic disperser or stirring blade.

The method for applying the coating solution onto the substrate may be, for example, a gravure coater method, small-diameter gravure coater method, reverse roll coater method, transfer roll coater method, kiss coater method, dip coater method, knife coater method, air doctor coater method, blade coater method, rod coater method, squeeze coater method, cast coater method, die coater method, screen printing method, and spray coating method, etc.

The method of removing the solvent from the coated film after coating is not particularly restricted so long as it is a method that does not adversely affect the substrate. For example, it may be a method of drying the substrate at a temperature below the melting point of the constituent material of the substrate while anchoring it, a method of reduced pressure drying at low temperature, or a method of immersing in a poor solvent for the resin binder to solidify the resin binder, while simultaneously extracting out the solvent. Some of the solvent may be allowed to remain so long as it does not produce any notable effect on the power storage device properties.

The separator produced as described above is measured to determine the area of the pattern (e.g., coverage ratio) and/or the shape of the thermoplastic polymer layer on the separator surface using the inspection device described above, and the quality of the thermoplastic polymer layer or the quality of the separator including the thermoplastic polymer layer is evaluated against a predetermined standard. Specifically, an assessment of "good" is assigned if the predetermined standard is satisfied, and "poor" is assigned if the predetermined standard is not satisfied. This allows a separator with high reliability to be efficiently produced according to the invention.

As explained above, the present invention according to one aspect provides a method for producing a separator, and according to another aspect it provides an inspection device. The description of the separator herein relates to the features of the separator of the invention in an inspection device, and the description of the inspection device herein relates to an inspection device in a method for producing a separator. Specifically, the conditions specified in any one of [9] to [14], [18] and [19] above under "Solution to Problem" may be considered to be the description of the separator according to the invention for an inspection device, and the conditions according to any one of [2] to [7] and [17] may be considered to be the description of the inspection device according to the invention of a method for producing a separator. More specifically, the preferred conditions selected for the thermoplastic polymer layer and inorganic filler layer as explained above may be considered as a description of the separator for the invention of an inspection device, and the preferred conditions for any one or more selected from the group consisting of the separator, camera and light source may be considered as a description of the inspection device according to an invention of a method for producing a separator.

EXAMPLES

Evaluation of the physical properties mentioned throughout the Examples was carried out by the following methods.
(1) Substrate Thickness ($\mu$m)

A 10 cm×10 cm-square sample was cut out from the substrate, 9 locations (3 points×3 points) were selected in a lattice form, and a microthickness meter (Type KBM by Toyo Seiki Seisakusho, Ltd.) was used for measurement of the thickness at room temperature (23±2° C.). The average for the values measured at the 9 locations was calculated as the thickness of the substrate. The differences of the maximum and minimum from the mean for the thicknesses at the 9 measured locations were calculated for the thickness variation.
(2) Porosity (%)

A 10 cm×10 cm-square sample was cut out from the substrate, and the volume (cm$^3$) and mass (g) were determined. The values were used to calculate the porosity by the following formula, using 0.95 (g/cm$^3$) as the density of the substrate.

$$\text{Porosity (\%)}=(1-\text{mass/volume/0.95})\times100$$

(3) Air Permeability (Sec/100 cm$^3$)

The air permeability of the separator was determined as the air permeability resistance measured with a Gurley air permeability tester (G-B21™ by Toyo Seiki Kogyo Co., Ltd.), according to JIS P-8117. When the thermoplastic polymer-containing layer is only present on one side of the substrate, the needle may be used for piercing from the side where the thermoplastic polymer-containing layer is present.
(4) Mean Particle Size (D50) of Particulate Polymer and Inorganic Filler The mean particle size (D50) of the particulate polymer and inorganic filler was measured using a particle size measuring device ("Microtrac UPA150", product name of Nikkiso Co., Ltd.). The mean particle size was recorded as the value for the 50% particle size (D50) in data obtained under measuring conditions with a loading index of 0.20 and a measuring time of 300 seconds.
(5) Area Coverage Ratio of Thermoplastic Polymer-Containing Layer by SEM The area coverage ratio of the thermoplastic polymer-containing layer was measured using a scanning electron microscope (SEM) (Model S-4800 by Hitachi Corp.). The separator sample was subjected to osmium vapor deposition and observed under conditions of 1.0 kV acceleration voltage, 50×, and the surface coverage ratio was calculated by the following formula. The visual field size used was 2.54 mm×1.58 mm. The thermoplastic polymer-containing layer regions were defined as regions where the porous structure of the base material surface was not visible in the SEM photograph, or regions where the surface of any layer was not visible, and specifically regions where the porous structure of the surface of the inorganic filler porous layer was not visible.

Area coverage ratio of thermoplastic polymer-containing layer (%)=Area of thermoplastic polymer-containing layer÷(pore-containing area of substrate, or area of surface of any layer)+area of thermoplastic polymer-containing layer)×100

The area coverage ratio for each sample was the arithmetic mean for three measurements.

Production Example 1-1

(Production of Polyolefin Microporous Membrane B1)

High-density polyethylene homopolymer with a Mv of 700,000, at 45 parts by weight, high-density polyethylene homopolymer with a Mv of 300,000, at 45 parts by weight, and a mixture of polypropylene homopolymer with a Mv of 400,000 and polypropylene homopolymer with a Mv of 150,000 (weight ratio=4:3), at 10 parts by weight, were dry blended using a tumbler blender. To 99 parts by weight of the obtained polyolefin mixture there was added 1 part by weight of tetrakis-[methylene-(3',5'-di-t-butyl-4'-hydroxy-phenyl)propionate]methane as an antioxidant, and a tumbler blender was again used for dry blending to obtain a mixture. The obtained mixture was supplied to a twin-screw extruder using a feeder, under a nitrogen atmosphere. Liquid paraffin (kinematic viscosity at 37.78° C.: $7.59 \times 10^{-5}$ m$^2$/s) was also injected into the extruder cylinder by a plunger pump. The operating conditions for the feeder and pump were adjusted for a liquid paraffin content of 65 parts by weight and a resin composition concentration of 35 parts by weight in the total of 100 parts by weight of the mixture to be extruded.

The contents were then melt kneaded in the twin-screw extruder while heating to 230° C., the obtained melt kneaded mixture was extruded through a T-die onto a cooling roll controlled to a surface temperature of 80° C., and the extruded mixture was contacted with a cooling roll for casting and cooled to solidification to obtain a cast sheet. The sheet was then stretched to a factor of 7×6.4 at 112° C. using a simultaneous biaxial stretcher, and the stretched sheet was immersed in methylene chloride for extraction removal of the liquid paraffin and then dried and stretched by a factor of 2 in the transverse direction using a tenter stretcher at a temperature of 130° C. The stretched sheet was then relaxed to approximately 10% in the transverse direction and subjected to heat treatment to obtain a polyolefin microporous membrane B1 as a substrate.

The physical properties of the obtained polyolefin microporous membrane B1 were measured by the methods described above. The obtained polyolefin microporous membrane was also used directly as a separator and evaluated by the methods described above. The results are shown in Table 1.

[Production Examples 1-2 to 1-4] (Production of Polyolefin Microporous Membranes B2 to B4)

Polyolefin microporous membranes B2, B3 and B4 were obtained as substrates in the same manner as Production Example 1-1, except for changing the temperature and relaxation factor during stretching. The obtained polyolefin microporous membranes B2, B3 and B4 were evaluated in the same manner Production Example 1-1. The results are shown in Table 1.

<Synthesis of Particulate Polymer A1>

Into a reactor equipped with a stirrer, reflux condenser, drip tank and thermometer there were loaded 70.4 parts by weight of ion-exchanged water, 0.5 part by weight of "AQUALON KH1025" (registered trademark of Dai-ichi Kogyo Seiyaku Co., Ltd., 25% aqueous solution, listed as "KH1025" in the tables, same hereunder), and 0.5 part by weight of "ADEKA REASOAP SR1025" (registered trademark of Adeka Corp., 25% aqueous solution, listed as "SR1025" in the tables, same hereunder), and the internal temperature of the reactor was increased to 80° C. The internal temperature of the container was then kept at 80° C. while adding 7.5 parts by weight of ammonium persulfate (2% aqueous solution) (listed as "APS (aq)" in the tables, same hereunder).

Separately, a mixture of 38.5 parts by weight of methyl methacrylate, 19.6 parts by weight of n-butyl acrylate, 31.9 parts by weight of 2-ethylhexyl acrylate, 0.1 part by weight of methacrylic acid, 0.1 part by weight of acrylic acid, 2 parts by weight of 2-hydroxyethyl methacrylate, 5 parts by weight of acrylamide, 2.8 parts by weight of glycidyl methacrylate, 0.7 part by weight of trimethylolpropane triacrylate (Shin-Nakamura Chemical Co., Ltd.), 0.3 part by weight of γ-methacryloxypropyltrimethoxysilane, 7.5 parts by weight of ammonium persulfate (2% aqueous solution) and 52 parts by weight of ion-exchanged water was mixed for 5 minutes using a homomixer to prepare an emulsified liquid.

The obtained emulsified liquid was added dropwise from a drip tank into the reactor. The dropwise addition was initiated 5 minutes after addition of the ammonium persulfate aqueous solution to the reactor, adding the total amount of the emulsified liquid dropwise over a period of 150 minutes. During dropwise addition of the emulsified liquid, the internal temperature of the container was kept at 80° C.

Upon completion of the dropwise addition of the emulsified liquid, the internal temperature of the reactor was kept at 80° C. for a period of 90 minutes, after which the mixture was cooled to room temperature to obtain an emulsion. The obtained emulsion was adjusted to pH 9.0 using aqueous ammonium hydroxide (25% aqueous solution), to obtain an acrylic copolymer latex with a concentration of 40 weight % (starting polymer A1). The obtained starting polymer (aqueous dispersion) A1 was evaluated by the methods described above. The results are shown in Table 2.

<Synthesis of Particulate Polymer A2>

A copolymer latex (starting polymer A2) was obtained in the same manner as starting polymer (aqueous dispersion) A1, except for changing the composition of the monomer and other starting materials, and the polymerization conditions, as shown in Table 2. The obtained starting polymer (aqueous dispersion) A2 was evaluated by the methods described above. The results are shown in Table 2.

TABLE 1

| | Polyolefin porous substrate No. | | | |
| --- | --- | --- | --- | --- |
| | B1 | B2 | B3 | B4 |
| Substrate average thickness (μm) | 12 | 12 | 12 | 12 |
| Thickness variation (μm) | Within ±2 | Within ±2 | Within ±2 | Within ±2 |
| Porosity (%) | 44 | 29 | 44 | 44 |
| Air permeability (sec/100 cm$^3$) | 144 | 145 | 230 | 30 |

TABLE 2

| | | Starting material | Active component | Starting polymer | |
| --- | --- | --- | --- | --- | --- |
| | Type | name | content | A1 | A2 |
| Initial charging | Emulsifier | KH1025 | 25% | 0.5 | 0.5 |
| | | SR1025 | 25% | 0.5 | 0.5 |
| | Ion-exchanged water | | — | 70.4 | 70.4 |
| | Initiator | APS (aq) | 2% | 7.5 | 7.5 |
| Emulsion | Acid monomer | MAA | 100% | 0.1 | 1 |
| | | AA | 100% | 0.1 | 1 |

TABLE 2-continued

| | | Starting material | Active component | Starting polymer | |
| | Type | name | content | A1 | A2 |
| --- | --- | --- | --- | --- | --- |
| | (Meth)acrylic | MMA | 100% | 38.5 | 0 |
| | acid ester | BA | 100% | 19.6 | 0 |
| | | EHA | 100% | 31.9 | 10 |
| | | CHMA | 100% | 0 | 33 |
| | Cyano group-containing monomer | AN | 100% | 0 | 55 |
| | Functional group-containing monomer | HEMA | 100% | 2 | 0 |
| | | AM | 100% | 5 | 0 |
| | Crosslinking monomer | GMA | 100% | 2.8 | 0 |
| | | A-TMPT | 100% | 0.7 | 1 |
| | | AcSi | 100% | 0.3 | 0.5 |
| | Emulsifier | KH1025 | 25% | 3 | 2 |
| | | SR1025 | 25% | 3 | 0 |
| | | NaSS | 100% | 0.05 | 0 |
| | Initiator | APS (aq) | 2% | 7.5 | 7.5 |
| | Ion-exchanged water | — | | 52 | 52 |
| Physical properties | Glass transition temperature (Tg) | (° C.) | | −6 | 62 |
| | Mean particle size (D50) | (nm) | | 132 | 150 |

The names of the starting materials in Table 2 and Table 3 are as follows.

<Emulsifiers>

KH1025: AQUALON KH1025, trade name of Dai-ichi Kogyo Seiyaku Co., Ltd., 25% aqueous solution.

SR1025: ADEKA REASOAP SR1025, trade name of Adeka Corp., 25% aqueous solution.

NaSS: Sodium-p-styrenesulfonate

<Initiator>

APS: Ammonium persulfate (2% aqueous solution)

<Monomers>

((Meth)Acrylic Acid Monomers)

MAA: Methacrylic acid

AA: Acrylic acid ((Meth)Acrylic Acid Esters)

MMA: Methyl methacrylate

BA: n-Butyl acrylate

BMA: n-Butyl methacrylate

EHA: 2-Ethyl acrylatehexyl

CHMA: Cyclohexyl methacrylate (Aromatic Vinyl Monomer)

St: Styrene (Cyano Group-Containing Monomer)

AN: Acrylonitrile (Other Functional Group-Containing Monomers)

HEMA: 2-Hydroxyethyl methacrylate

AM: Acrylamide (Crosslinkable Monomers)

GMA: Glycidyl methacrylate

A-TMPT: Trimethylolpropane triacrylate

AcSi: γ-Methacryloxypropyltrimethoxysilane

Production Example A3

A portion of aqueous dispersion A1 obtained in Production Example A1 was used as a seed polymer for multistage polymerization to synthesize aqueous dispersion A3. Specifically, first a mixture of 20 parts by weight of aqueous dispersion A1 as solid content and 70.4 parts by weight of ion-exchanged water was loaded into a reactor equipped with a stirrer, reflux condenser, drip tank and thermometer, and the internal temperature of the reactor was increased to 80° C. The internal temperature of the container was then kept at 80° C. while adding 7.5 parts by weight of ammonium persulfate (2% aqueous solution). This was the initial charging.

Separately, a mixture of 38.5 parts by weight of methyl methacrylate, 19.6 parts by weight of n-butyl acrylate, 31.9 parts by weight of 2-ethylhexyl acrylate, 0.1 part by weight of methacrylic acid, 0.1 part by weight of acrylic acid, 2 parts by weight of 2-hydroxyethyl methacrylate, 5 parts by weight of acrylamide, 2.8 parts by weight of glycidyl methacrylate, 0.7 part by weight of trimethylolpropane triacrylate (Shin-Nakamura Chemical Co., Ltd.), 0.3 part by weight of γ-methacryloxypropyltrimethoxysilane, 7.5 parts by weight of ammonium persulfate (2% aqueous solution) and 52 parts by weight of ion-exchanged water was mixed for 5 minutes using a homomixer to prepare an emulsified liquid. The obtained emulsified liquid was added dropwise from a drip tank into the reactor. The dropwise addition was initiated 5 minutes after addition of the ammonium persulfate aqueous solution to the reactor, adding the total amount of the emulsified liquid dropwise over a period of 150 minutes. During dropwise addition of the emulsified liquid the internal temperature of the container was kept at 80° C.

Upon completion of the dropwise addition of the emulsified liquid, the internal temperature of the reactor was kept at 80° C. for a period of 90 minutes while stirring, after which the mixture was cooled to room temperature to obtain an emulsion. The obtained emulsion was adjusted to pH 9.0 using aqueous ammonium hydroxide (25% aqueous solution), to obtain an acrylic copolymer latex with a concentration of 40 weight % (starting polymer A3). The obtained starting polymer A3 was evaluated by the methods described above. The results are shown in Table 3.

Production Example A4

A copolymer latex (starting polymer A4) was obtained in the same manner as starting polymer A3, except for changing the composition of the seed polymer and other starting materials, and the polymerization conditions, as shown in Table 3. The obtained starting polymer A4 was evaluated by the methods described above. The results are shown in Table 3.

TABLE 3

| | | | Starting material | Active component | Starting polymer | |
| | | Type | name | content | A3 | A4 |
| --- | --- | --- | --- | --- | --- | --- |
| Initial charging | | Seed polymer type | — | | A1 | A2 |
| | | Seed polymer size | (nm) | | 132 | 150 |
| | | Seed polymer content | 100% | | 20 | 20 |
| | | Ion-exchanged water | — | | 70.4 | 70.4 |
| | | Initiator | APS (aq) | 2% | 7.5 | 7.5 |
| Emulsion | | Acid monomer | MAA | 100% | 0.1 | 1 |
| | | | AA | 100% | 0.1 | 1 |
| | | (Meth)acrylic | MMA | 100% | 38.5 | 0 |
| | | acid ester | BA | 100% | 19.6 | 0 |
| | | | EHA | 100% | 31.9 | 10 |
| | | | CHMA | 100% | 0 | 33 |
| | | Cyano group-containing monomer | AN | 100% | 0 | 55 |
| | | Functional group-containing monomer | HEMA | 100% | 2 | 0 |
| | | | AM | 100% | 5 | 0 |

TABLE 3-continued

| | | Starting material | Active component | Starting polymer | |
| | Type | name | content | A3 | A4 |
| --- | --- | --- | --- | --- | --- |
| | Crosslinking | GMA | 100% | 2.8 | 0 |
| | monomer | A-TMPT | 100% | 0.7 | 1 |
| | | AcSi | 100% | 0.3 | 0.5 |
| | Emulsifier | KH1025 | 25% | 3 | 2 |
| | | SR1025 | 25% | 3 | 0 |
| | | NaSS | 100% | 0.05 | 0 |
| | Initiator | APS (aq) | 2% | 7.5 | 7.5 |
| | Ion-exchanged water | | — | 52 | 52 |
| Physical properties | Glass transition temperature (Tg) | | (° C.) | −6 | 62 |
| | Mean particle size (D50) | | (nm) | 500 | 500 |

Example I-1

After mixing 20 parts by weight of starting polymer A1 and 80 parts by weight of starting polymer A4, the mixture was uniformly dispersed to prepare a coating solution containing a thermoplastic polymer (30% solid weight). Carboxymethyl cellulose was added as a thickener to 1 weight % of the coating solution, adjusting the viscosity of the coating solution to 30 mPa·s. A gravure coater was then used to coat one side (surface (A)) of polyolefin microporous membrane B1 with the coating solution to a thickness of 1 μm. The thermoplastic polymer coating solution was coated in a dot pattern as shown in FIG. 4(A). The dot sizes were 200 μm, and the distances between the centers of adjacent dots were 600 μm. The unit pattern size was 600 μm×600 μm. The area coverage ratio of the thermoplastic polymer with respect to the polyolefin microporous membrane was 20%. The coating solution that had been applied at 40° C. was then dried to remove the water.

The coating solution was also applied onto the side of the polyolefin microporous membrane B1 opposite from surface (A) (i.e., onto surface (B)) and dried in the same manner as described above. A separator was thus obtained having a thermoplastic polymer-containing layer formed on both sides of the polyolefin microporous membrane B1.

A separator was thus obtained having a thermoplastic polymer-containing layer formed on both sides of the polyolefin microporous membrane B1.

The area of the thermoplastic polymer layer of the obtained separator was measured by the method described below.

An inspection device as shown in FIG. 1 was used to determine the pattern area coverage of the thermoplastic polymer-containing layer.

The light sources used were eight (8) light sources with a wavelength of 630 nm (spherical, 3 mm diameter, LED), disposed surrounding the separator at equal spacings. The distance from each light source to the separator surface was 35 mm, the incident angle θ of light onto the plane of the separator was 85°, the location from the inspected separator surface to the camera was 200 mm, and the camera position was set perpendicularly above the planar direction of the inspected separator.

The camera used was a VHX-7020 (Keyence Corp., CMOS image sensor, 3,190,000 pixels). Images were taken with a 20× lens magnification and with the focus set to the inspection portion. The obtained images were binarized using image processing software (ImageJ), and the pattern area coverage of the thermoplastic polymer-containing layer was calculated. Specifically, the obtained observation field was analyzed by image analysis processing software ImageJ (version 1.46) from the obtained image, and the area coverage of the thermoplastic polymer in the visual field was determined. Specifically, each photographed image file was opened and the entire visual field was selected using "Rectangular selections", for selection of an evaluation area. Binary processing was then carried out for separation into the thermoplastic polymer and non-thermoplastic polymer portions. Specifically, "Threshold" was selected and processing was carried out with "0-100" as the inversion range among 256 shades.

The separator was set still with respect to the camera for inspection, and the area coverage of the pattern of the thermoplastic polymer-containing layer was determined.

The same separator was observed by SEM to determine the pattern area coverage of the thermoplastic polymer-containing layer, and the deviation between the two values was determined.

The results are shown in Table 4.

Examples I-2 to I-9 and I-12 to I-14

Inspection was carried out in the same manner as Example 1, except for changing the inspection unit construction, the type of substrate, the type of particulate polymer, the form of the thermoplastic polymer and the particle size of the thermoplastic polymer as shown in Table 4 and Table 5, and the deviation from the SEM observation results was determined. The PVdF-HFP used in Example I-5 was XPH-883 (Solvay, Japan). The "Non-equal spacing" placement of the light sources in Example 1-4 means that the inspected separator surface and two light sources were disposed at a 45° angle and inspection was carried out with that placement.

Example I-10

A coating solution prepared by uniformly dispersing 92.0 parts by weight of aluminum hydroxide oxide (mean particle size: 1000 nm) as an inorganic filler, 8.0 parts by weight of an acrylic latex suspension (solid concentration: 40%, mean particle size: 150 nm) and 1.0 part by weight of an aqueous ammonium polycarboxylate solution (SN Dispersant 5468, product of San Nopco, Ltd.) in 100 parts by weight of water was coated onto the surface of the polyolefin microporous membrane B1 as the porous substrate, using a microgravure coater. This was dried at 60° C. to remove the water to form an inorganic filler layer with a thickness of 4.0 μm on the polyolefin resin porous film.

A thermoplastic polymer-containing layer was formed on the inorganic filler layer in the same manner as Example I-1 to obtain a separator. Inspection was carried out in the same manner as Example I-1 except for the separator used, and the deviation from the SEM observation results was determined.

Example I-11

A separator was obtained in the same manner Example 1-8, except for changing the inorganic filler particle size (nm) as shown in Table 5. Inspection was carried out in the same manner as Example I-1 except for the separator used, and the deviation from the SEM observation results was determined.

Comparative Example I-1

This was carried out in the same manner as Example I-1 except for changing the construction of the inspection unit as shown in Table 5, and the deviation from the SEM observation results was determined.

Table 4 and Table 5 show the inspection unit constructions, separator conditions, observation results and degree of detachment for Examples I-1 to I-14 and Comparative Example I-1.

was set at a 0° angle with respect to the angle of reflection of the separator surface being inspected from the light source.

A camera used had 3,190,000 pixels and employed a CMOS image sensor, and the separator surface was photographed at 200 m/min while conveying at 20 m/min. The

TABLE 4

| | | Example I-1 | Example I-2 | Example I-3 | Example I-4 | Example I-5 | Example I-6 | Example I-7 |
|---|---|---|---|---|---|---|---|---|
| Inspection unit configuration | Incident angle | 85° | 60° | 85° | 85° | 85° | 60° | 85° |
| | Number of light sources | 8 | 8 | 2 | 2 | 1 | 1 | 8 |
| | Light source arrangement | Equal spacing | Equal spacing | Equal spacing | Non-equal spacing | Equal spacing | Equal spacing | Equal spacing |
| Separator conditions | Substrate | B1 | B1 | B1 | B1 | B1 | B1 | B1 |
| | Thermoplastic polymer location | On polyolefin | On polyolefin | On polyolefin | On polyolefin | On polyolefin | On polyolefin | On polyolefin |
| | Particulate polymer type | A1/A4 | A1/A4 | A1/A4 | A1/A4 | A1/A4 | A1/A4 | A1/PVdF-HFP |
| | Mixing ratio of particulate polymers | 20/80 | 20/80 | 20/80 | 20/80 | 20/80 | 20/80 | 20/80 |
| | Particle size of dried particulate polymer | 500 nm | 500 nm | 500 nm | 500 nm | 500 nm | 500 nm | 500 nm |
| | Form of thermoplastic polymer layer surface | Particulate | Particulate | Particulate | Particulate | Particulate | Particulate | Particulate |
| | Inorganic filler particle size | — | — | — | — | — | — | — |
| | D1/D2 | — | — | — | — | — | — | — |
| | Area observed by SEM | 16.4% | 16.4% | 16.4% | 16.4% | 16.4% | 16.4% | 17.2% |
| | Area measured with inspection unit | 18.8% | 27.5% | 20.2% | 21.6% | 25.4% | 35.5% | 17.1% |
| | Deviation with respect to area observed by SEM | 14.6% | 67.7% | 23.0% | 31.6% | 54.7% | 116.5% | −0.6% |

TABLE 5

| | | Example I-8 | Example I-9 | Example I-10 | Example I-11 | Example I-12 | Example I-13 | Example I-14 | Comp. Example I-1 |
|---|---|---|---|---|---|---|---|---|---|
| Inspection unit configuration | Incident angle | 85° | 85° | 85° | 85° | 85° | 85° | 85° | 45° |
| | Number of light sources | 8 | 8 | 8 | 8 | 8 | 8 | 8 | 8 |
| | Light source arrangement | Equal spacing | Equal spacing | Equal spacing | Equal spacing | Equal spacing | Equal spacing | Equal spacing | Equal spacing |
| Separator conditions | Substrate | B1 | B1 | B1 | B1 | B2 | B3 | B4 | B1 |
| | Thermoplastic polymer location | On polyolefin | On polyolefin | On inorganic filler layer | On inorganic filler layer | On polyolefin | On polyolefin | On polyolefin | On polyolefin |
| | Particulate polymer type | A1/A3 | A1/A2 | A1/A4 | A1/A4 | A1/A4 | A1/A4 | A1/A4 | A1/A4 |
| | Mixing ratio of particulate polymers | 20/80 | 20/80 | 20/80 | 20/80 | 20/80 | 20/80 | 20/80 | 20/80 |
| | Particle size of dried particulate polymer | — | 130 nm | 500 nm | 500 nm | 500 nm | 500 nm | 500 nm | 500 nm |
| | Form of thermoplastic polymer layer surface | Paste | Particulate | Particulate | Particulate | Particulate | Particulate | Particulate | Particulate |
| | Inorganic filler particle size | — | — | 1000 nm | 500 nm | — | — | — | — |
| | D1/D2 | — | — | 0.5 | 1.0 | — | — | — | — |
| | Area observed by SEM | 17.6% | 17.3% | 13.5% | 13.4% | 17.0% | 16.8% | 15.9% | 16.4% |
| | Area measured with inspection unit | 18.0% | 19.9% | 13.5% | 16.1% | 17.7% | 17.8% | 19.1% | 62.9% |
| | Deviation with respect to area observed by SEM | 2.0% | 15.0% | 0.0% | 20.0% | 4.0% | 6.0% | 20.1% | 283.4% |

Example II-1

A separator was obtained having a thermoplastic polymer-containing layer formed on both sides of the polyolefin microporous membrane B1, similar to Example I-1.

The area of the thermoplastic polymer layer of the obtained separator was measured by the method described below.

A light source and camera were installed on one roll of an apparatus having a mechanism for conveying a separator through multiple rolls. Light sources each with a wavelength of 630 nm (rod-shaped, 1000 mm, LED) were set at equal spacings on both sides of the conveyed separator. The distance from each light source to the separator surface was 600 mm, the incident angle θ of light onto the plane of the separator was 85°, the distance from the inspected separator surface to the camera was 600 mm, and the camera position obtained images were binarized using image processing software (ImageJ), and the pattern area coverage of the thermoplastic polymer-containing layer was calculated. Specifically, the obtained observation field was analyzed by image analysis processing software ImageJ (version 1.46) from the obtained image, and the area coverage of the thermoplastic polymer in the visual field was determined. Specifically, each photographed image file was opened and the entire visual field was selected using "Rectangular selections", for selection of an evaluation area. Binary processing was then carried out for separation into the thermoplastic polymer and non-thermoplastic polymer portions. Specifically, "Threshold" was selected and processing was carried out with "0-100" as the inversion range among 256 shades.

The pattern area coverage of the thermoplastic polymer-containing layer obtained by the method described above was compared with the area coverage obtained by SEM observation in the same manner as Example I-1, and the deviation was determined.

The results are shown in Table 6.

Examples II-2 to II-5

Inspection was carried out in the same manner as Example II-1 except for changing the construction of the inspection unit as shown in Table 6, and the deviation from the SEM observation results was determined.

Comparative Example II-1

Inspection was carried out in the same manner as Example II-1 except for changing the construction of the inspection unit as shown in Table 6, and the deviation from the SEM observation results was determined.

polymer layer on a separator surface which has a thermoplastic polymer layer. By evaluating an image of the coating film surface of the thermoplastic polymer layer after drying of the thermoplastic polymer layer, the method for evaluating the area coverage of the thermoplastic polymer layer is convenient, while also allowing evaluation without destruction of the separator, thus contributing to more manageable development and production steps for excellent separators.

REFERENCE SIGNS LIST

1 Light source

2 Camera

10 Stage

11 Roll

S Separator

S1 Inspection portion

TABLE 6

| | | Example II-1 | Example II-2 | Example II-3 | Example II-4 | Example II-5 | Comp. Example II-1 |
|---|---|---|---|---|---|---|---|
| Inspection unit configuration | Incident angle | 85° | 85° | 85° | 85° | 85° | 45° |
| | Number of light sources | 2 | 1 | 1 | 1 | 1 | 1 |
| | Distance from inspected separator surface to camera | 600 mm | 600 mm | 1200 mm | 600 mm | 600 mm | 600 mm |
| | Camera arrangement | Position at ±0° to angle of reflection | Position at ±0° to angle of reflection | Position at ±0° to angle of reflection | Position at −10° to angle of reflection | Position at ±0° to angle of reflection | Position at ±0° to angle of reflection |
| | Length of light source | 1000 mm | 1000 mm | 1000 mm | 1000 mm | 100 mm | 1000 mm |
| | Light source arrangement | Equal spacing | Non-equal spacing | Non-equal spacing | Non-equal spacing | Non-equal spacing | Non-equal spacing |
| Separator conditions | Substrate | B1 | B1 | B1 | B1 | B1 | B1 |
| | Thermoplastic polymer location | On polyolefin | On polyolefin | On polyolefin | On polyolefin | On polyolefin | On polyolefin |
| | Particulate polymer type | A1/A4 | A1/A4 | A1/A4 | A1/A4 | A1/A4 | A1/A4 |
| | Mixing ratio of particulate polymers | 20/80 | 20/80 | 20/80 | 20/80 | 20/80 | 20/80 |
| | Particle size of dried particulate polymer | 500 nm | 500 nm | 500 nm | 500 nm | 500 nm | 500 nm |
| | Form of thermoplastic polymer layer surface | Particulate | Particulate | Particulate | Particulate | Particulate | Particulate |
| | Area observed by SEM | 16.4% | 16.4% | 16.4% | 16.4% | 16.4% | 16.4% |
| | Area measured with inspection unit (200 m/min) | 18.2% | 23.3% | 55.2% | 34.7% | 24.6% | 89.9% |
| | Area measured with inspection unit (20 m/min) | 16.9% | 18.5% | 18.5% | 22.2% | 19.1% | 87.0% |
| | Deviation with respect to area observed by SEM (200 m/min) | 11.0% | 42.1% | 236.6% | 111.6% | 50.0% | 448.2% |
| | Deviation with respect to area observed by SEM (20 m/min) | 3.0% | 12.8% | 12.8% | 35.4% | 16.5% | 430.5% |

As clearly shown in Table 4, Table 5 and Table 6, it was confirmed that in the Examples in which the incident angle θ of light on the separator surface was set to 60° to 90°, the deviation with respect to the measured value by SEM was smaller, allowing approximately accurate measurement of the pattern area coverage of the thermoplastic polymer-containing layer, compared to the Comparative Example in which it was set to 45°. In particular, it was confirmed that more accurate measurement was possible when multiple light sources were disposed at equal spacings.

Similar favorable results were also obtained when the material of the thermoplastic polymer differed, or even when a thermoplastic polymer-containing layer was formed on the inorganic filler.

It was further confirmed that particularly satisfactory results are obtained when the parameters of the separator are optimized.

INDUSTRIAL APPLICABILITY

According to the invention it is possible to precisely and efficiently measure the area coverage of a thermoplastic

The invention claimed is:

1. An inspection device for a separator for a lithium ion secondary battery having a thermoplastic polymer layer, wherein:

the separator comprises a substrate and the thermoplastic polymer layer disposed on a part of one or both sides of the substrate, the inspection device includes two or more light sources that simultaneously irradiate light onto an inspection portion of the separator at an incident angle θ of 60° to 90°, a camera, an adsorption stage with a suction hole, and a suction unit below the adsorption stage, the two or more light sources are located at equally spaced positions in a circumferential direction around the inspection portion of the separator, a first of the two or more light sources irradiates the inspection portion of the separator in a first direction, a second of the two or more light sources irradiates the inspection portion of the separator in a second direction, and the first direction is different from the second direction, and the suction unit causes the separator to be adsorbed to the adsorption stage by air suction.

2. The inspection device for a separator according to claim 1, wherein the distance from the surface of the separator to the camera is 10 mm to 1000 mm.

3. The inspection device for a separator according to claim 1, wherein the camera is positioned at an angle in the range of −5° to +5° with respect to an angle of reflection of incident light from any one of the two or more light sources.

4. The inspection device for a separator according to claim 1, which has a mount that anchors the camera, the mount having a stage allowing the camera to be moved in any one or two or more directions from among forward-backward, right-left and up-down.

5. The inspection device for a separator according to claim 1, wherein each of the two or more light sources has a single-side length or a diameter of 1 mm to 3000 mm.

6. The inspection device for a separator according to claim 1, wherein the camera is a camera with 1,000,000 or more pixels.

7. A method for producing a separator for a lithium ion secondary battery having a thermoplastic polymer layer, wherein the separator comprises a substrate and the thermoplastic polymer layer disposed on a part of one or both sides of the substrate, and the thermoplastic polymer layer has a dotted, unit pattern, and an air permeability of the separator is 40 seconds/100 cm³ or greater and 500 seconds/ 100 cm³ or lower, the method comprising:

inspecting a surface of the separator using an inspection device including two or more light sources that simultaneously irradiate light onto an inspection portion of the separator at an incident angle θ of 60° to 90°, a camera, an adsorption stage with a suction hole, and a suction unit below the adsorption stage; and determining a coverage ratio of the thermoplastic polymer layer based on an image photographed by the camera, wherein the two or more light sources are located at equally spaced positions in a circumferential direction around the inspection portion of the separator, wherein a first of the two or more light sources irradiates the inspection portion of the separator in a first direction, a second of the two or more light sources irradiates the inspection portion of the separator in a second direction, and the first direction is different from the second direction, and wherein the suction unit causes the separator to be adsorbed to the adsorption stage by air suction.

8. The method for producing a separator according to claim 7, wherein the thermoplastic polymer layer includes a particulate polymer compound.

9. The method for producing a separator according to claim 8, wherein a mean particle size of the particulate polymer compound is 50 nm to 10,000 nm.

10. The method for producing a separator according to claim 8, wherein an inorganic filler layer is present on one or both sides of the substrate, and the thermoplastic polymer layer is present on at least a portion of the inorganic filler layer.

11. The method for producing a separator according to claim 10, wherein a volume-average particle size of an inorganic filler in the inorganic filler layer is 50 nm to 2,000 nm.

12. The method for producing a separator according to claim 10, wherein a volume-average particle size D1 of a particulate thermoplastic polymer in the thermoplastic polymer layer and a volume-average particle size D2 of a particulate inorganic filler in the inorganic filler layer satisfy the following formula:

$$D1/D2 \leq 0.8 \text{ or } D1/D2 \geq 1.2.$$

13. The method for producing a separator according to claim 7, wherein the unit pattern is periodic.

14. The method for producing a separator according to claim 7, further comprising assessing a quality of the separator based on the dotted, unit pattern and/or the coverage ratio.

15. The method for producing a separator according to claim 7, wherein the camera is a camera with 1,000,000 or more pixels.

16. A method for producing a separator for a lithium ion secondary battery having a thermoplastic polymer layer, wherein:

the separator comprises a substrate and the thermoplastic polymer layer disposed on a part of one or both sides of the substrate, the thermoplastic polymer layer has a dotted, unit pattern, and a thickness of the thermoplastic polymer layer is 0.01 μm or greater and 10.0 μm or smaller, the method, comprising:

continuous coating of the thermoplastic polymer layer onto the substrate;

inspecting a surface of the separator during the continuous coating using an inspection device including a light source that irradiates light onto an inspection portion of the separator at an incident angle θ of 60° to 90°, and a camera; and determining a coverage ratio of the thermoplastic polymer layer based on an image photographed by the camera, wherein the inspection portion of the separator is a section in contact with a roll, and the distance from the inspection portion of the separator to the camera is 10 mm to 1000 mm, wherein the camera is positioned at an angle in the range of −5° to +5° with respect to an angle of reflection of incident light to the inspection portion of the separator from the light source, and wherein the light source has a single-side length or a diameter of 200 mm to 3000 mm.

17. The method for producing a separator according to claim 16, wherein the camera is a camera with 1,000,000 or more pixels.

18. The method for producing a separator according to claim 16, further comprising assessing a quality of the separator based on the dotted, unit pattern and/or the coverage ratio.

* * * * *